United States Patent [19]

Ducol et al.

[11] 4,109,595

[45] Aug. 29, 1978

[54] MULTIDIFFERENTIAL DEVICE

[75] Inventors: Jean-Paul Ducol; Dominique Gobry, both of Saint-Julien les Villas; Jean-Pierre Raisin, Troyes, all of France

[73] Assignees: Institut Textile de France Agence Nationale de Valorisation de la Recherche (ANVAR), both of France

[21] Appl. No.: 694,066

[22] Filed: Jun. 7, 1976

[30] Foreign Application Priority Data

Jun. 13, 1975 [FR] France .................................. 75 18648
Jul. 22, 1975 [FR] France .................................. 75.22895

[51] Int. Cl.² ...................... D05B 19/00; D05B 27/08
[52] U.S. Cl. .............................. 112/121.11; 112/136; 112/208; 112/214; 74/710; 271/225
[58] Field of Search .................... 112/121.11, 121.12, 112/203, 208, 212, 214, 136, 153; 74/710, 714; 271/225

[56] References Cited

U.S. PATENT DOCUMENTS

| 3,430,520 | 3/1969 | Gantzer | 74/714 |
| 3,650,229 | 3/1972 | Rovin | 112/121.11 |
| 3,925,713 | 12/1975 | Richmond | 112/121.11 X |

FOREIGN PATENT DOCUMENTS 1,299,051  6/1962  France ........................................ 74/710

*Primary Examiner*—Peter Nerbun

*Attorney, Agent, or Firm*—Weingarten, Maxham & Schurgin

[57] ABSTRACT

A multidifferential device of the type comprising a plurality of differentials, whereby each comprises a differential holder with at least two epicyclic gears and two planetary gears and in which the imaginary rotation axis of all the differential holders and planetary gears is the same. The differential holders and planetary gears are designed as rotary members, whereof two serve as input members and one serves as the output member. They comprise two end members and, between them, a plurality of intermediate members in which an end input and output member is constituted as a planetary gear, whereby the epicyclic gears of every other intermediate differential holder member are located at the same radial level relative to said rotation axis. A plurality of intermediate differential holder members each comprises an external or internal planetary gear path on both of its faces. At least one inner or outer epicyclic gear of each end member comprises a planetary gear.

This multidifferential device is applied to an installation for automatically guiding an article in front of a work point and specifically a tool, following a random but predetermined path.

The particular application is the guidance of textile articles to be joined together by sewing and associated with a sewing machine equipped with a work table.

21 Claims, 29 Drawing Figures

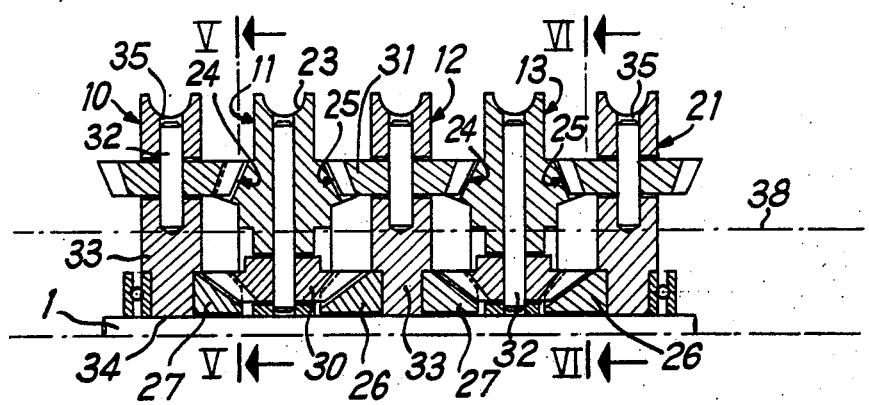
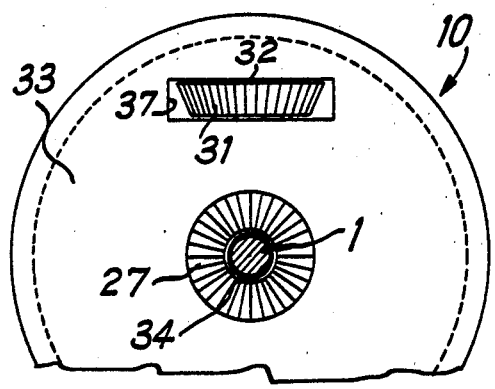
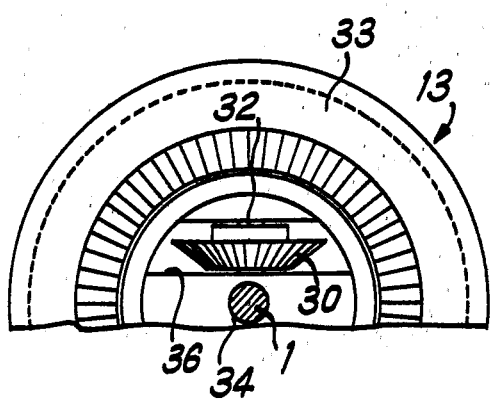

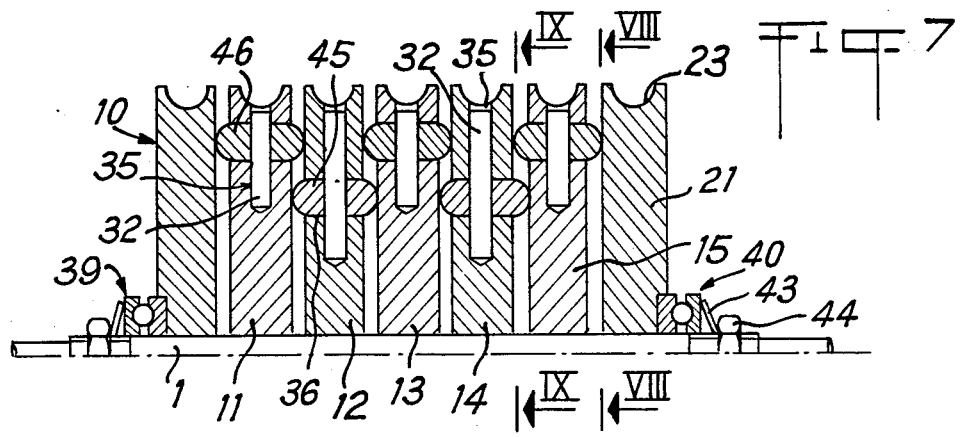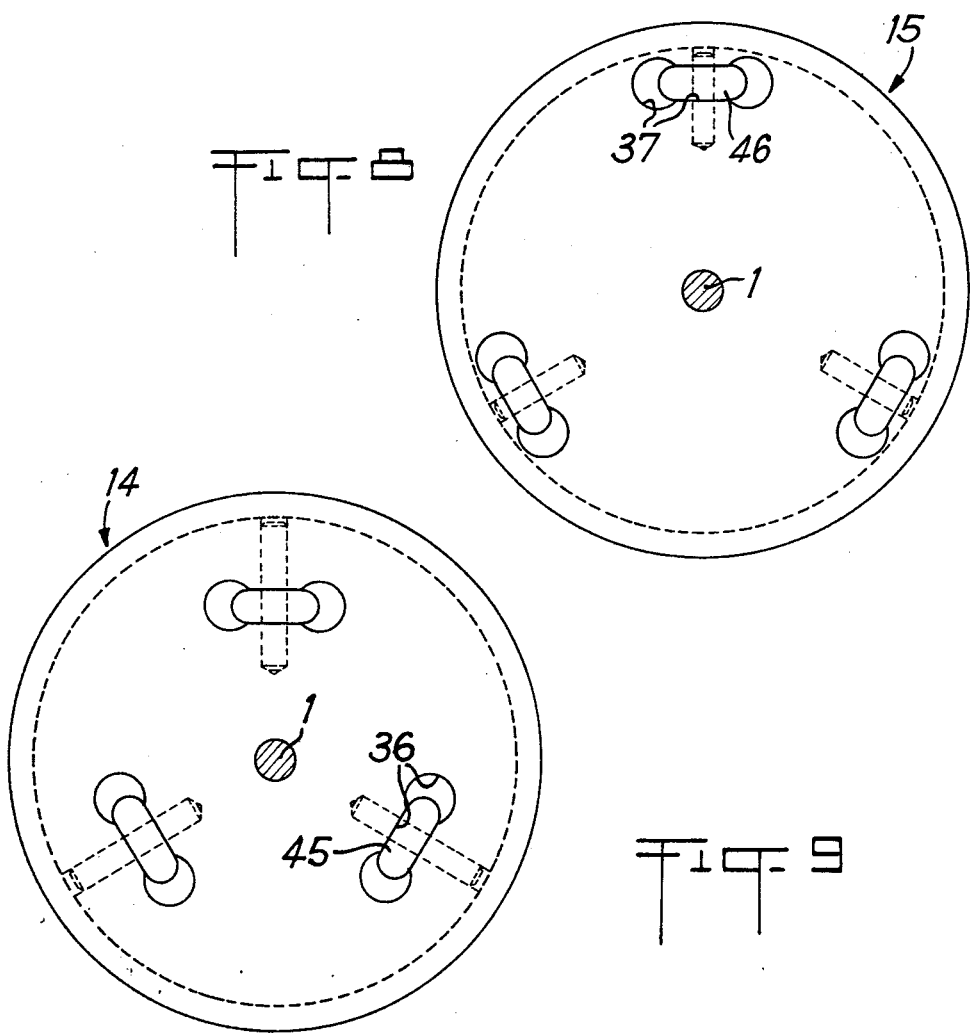

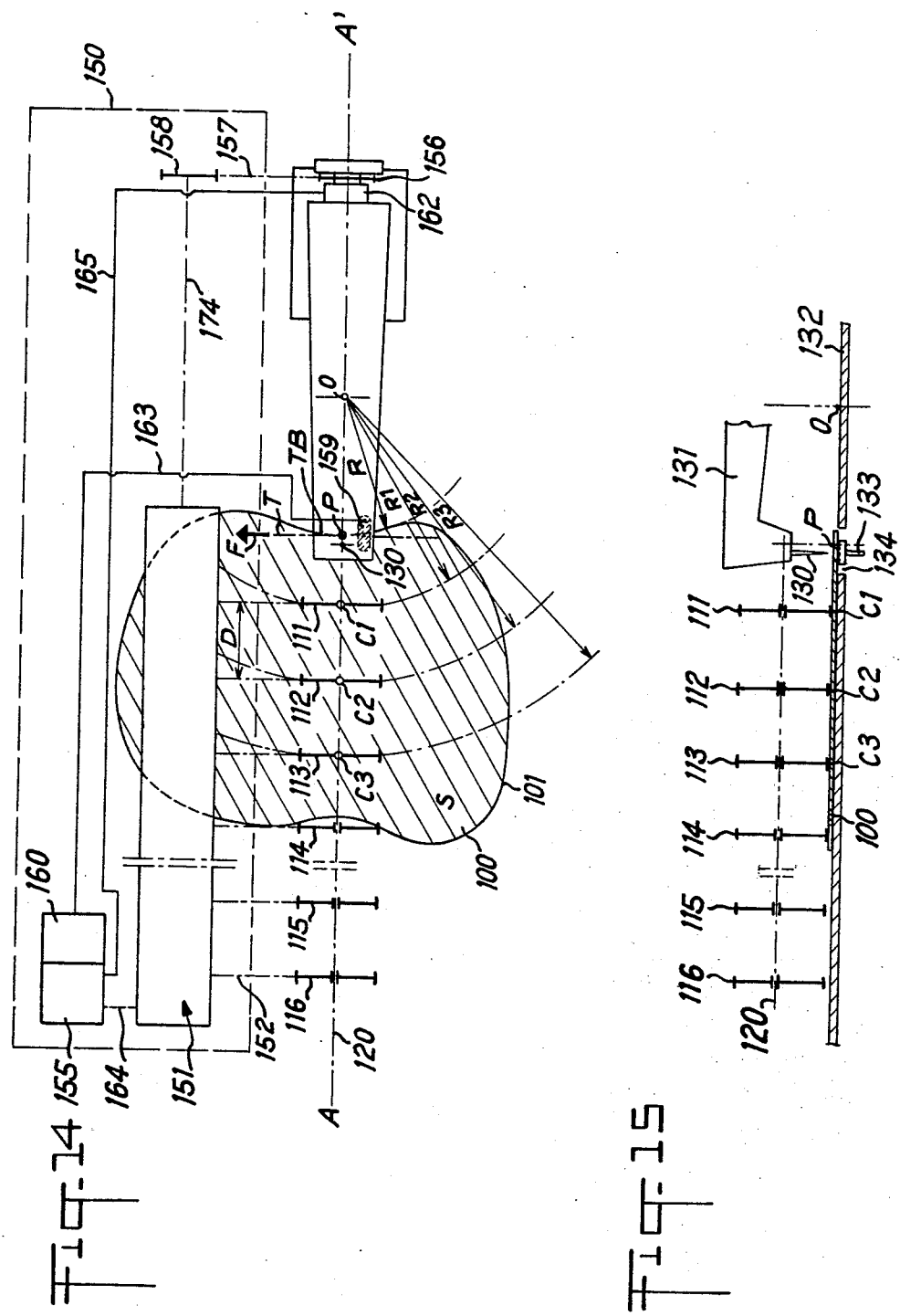

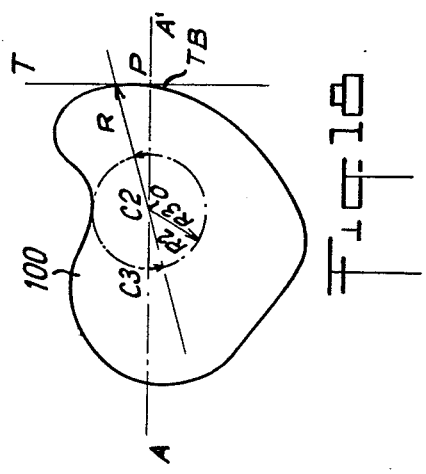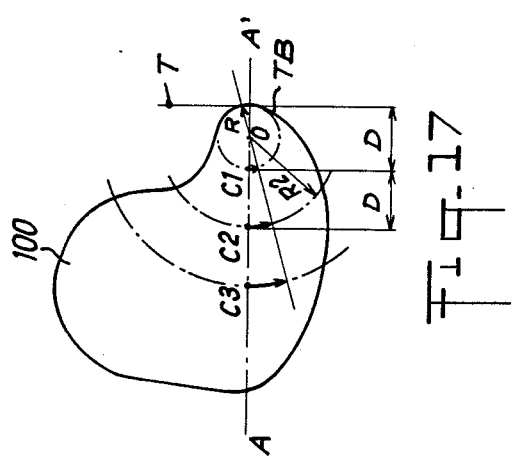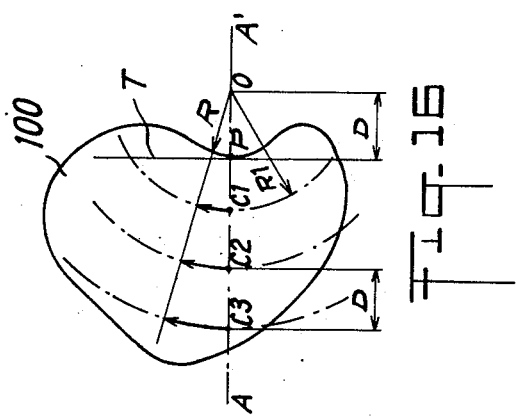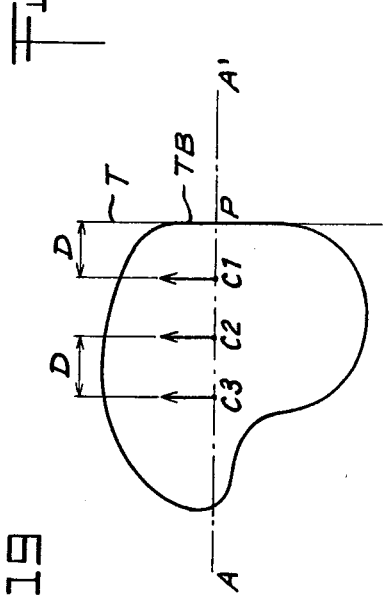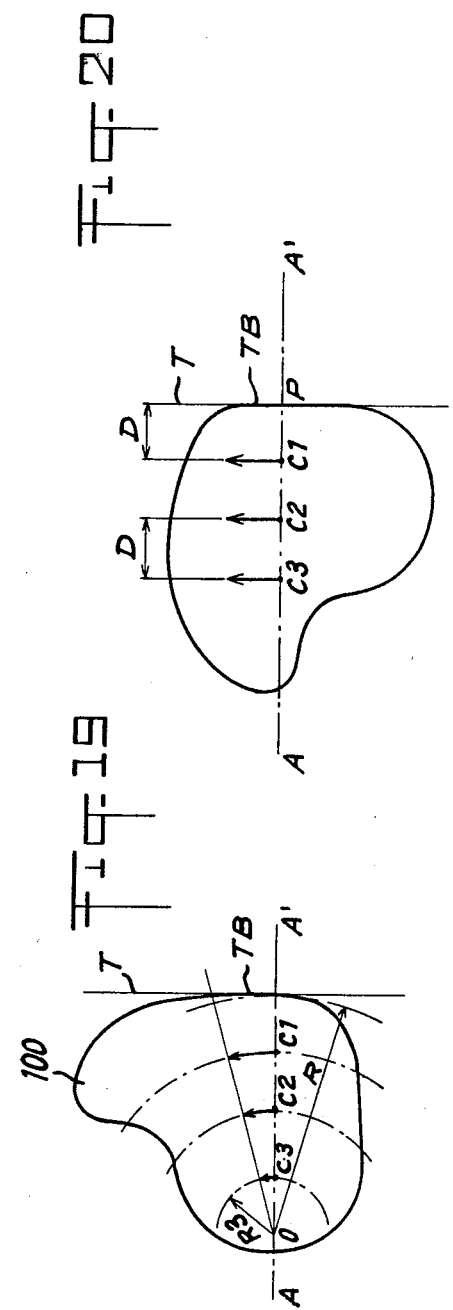

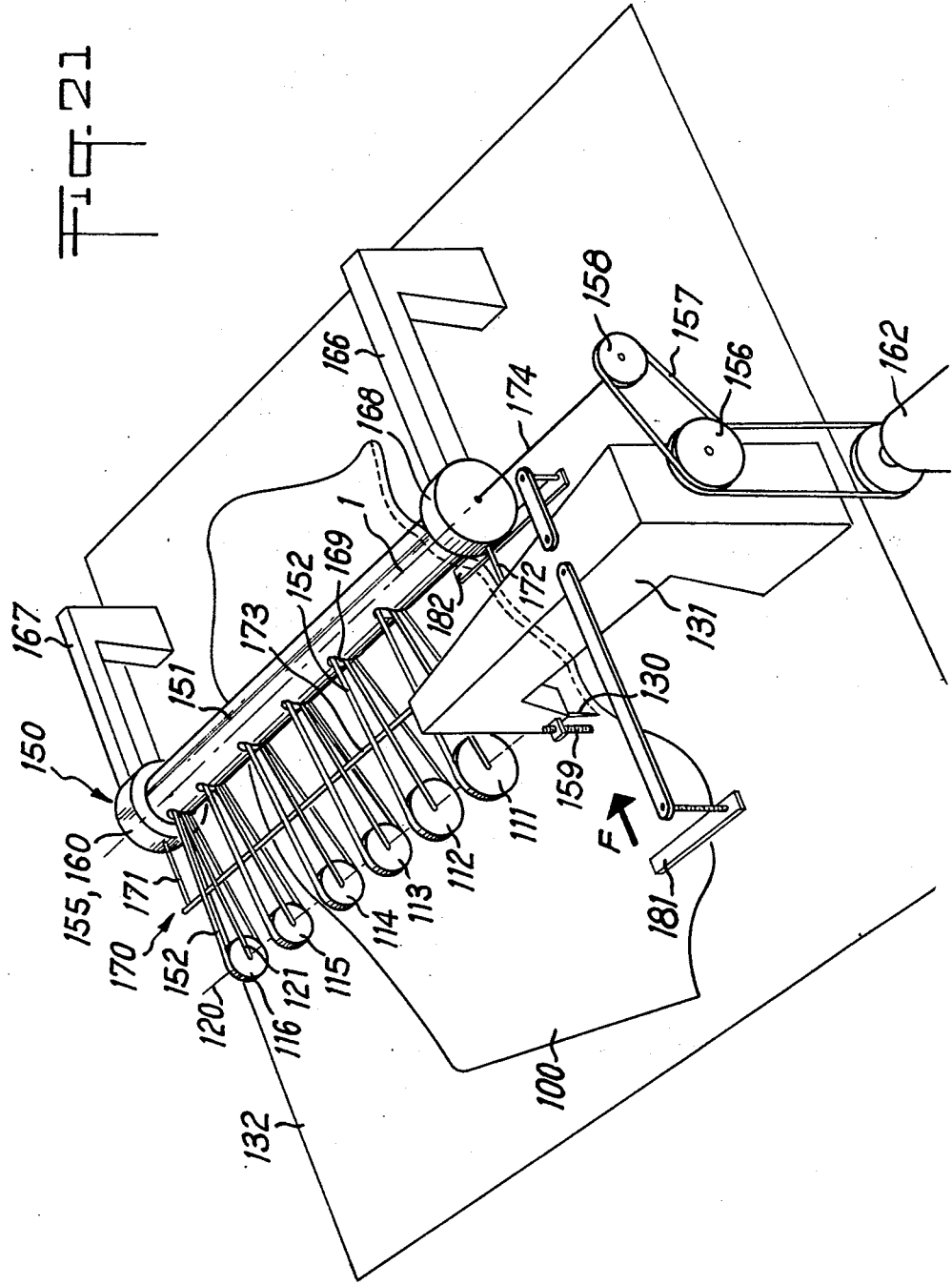

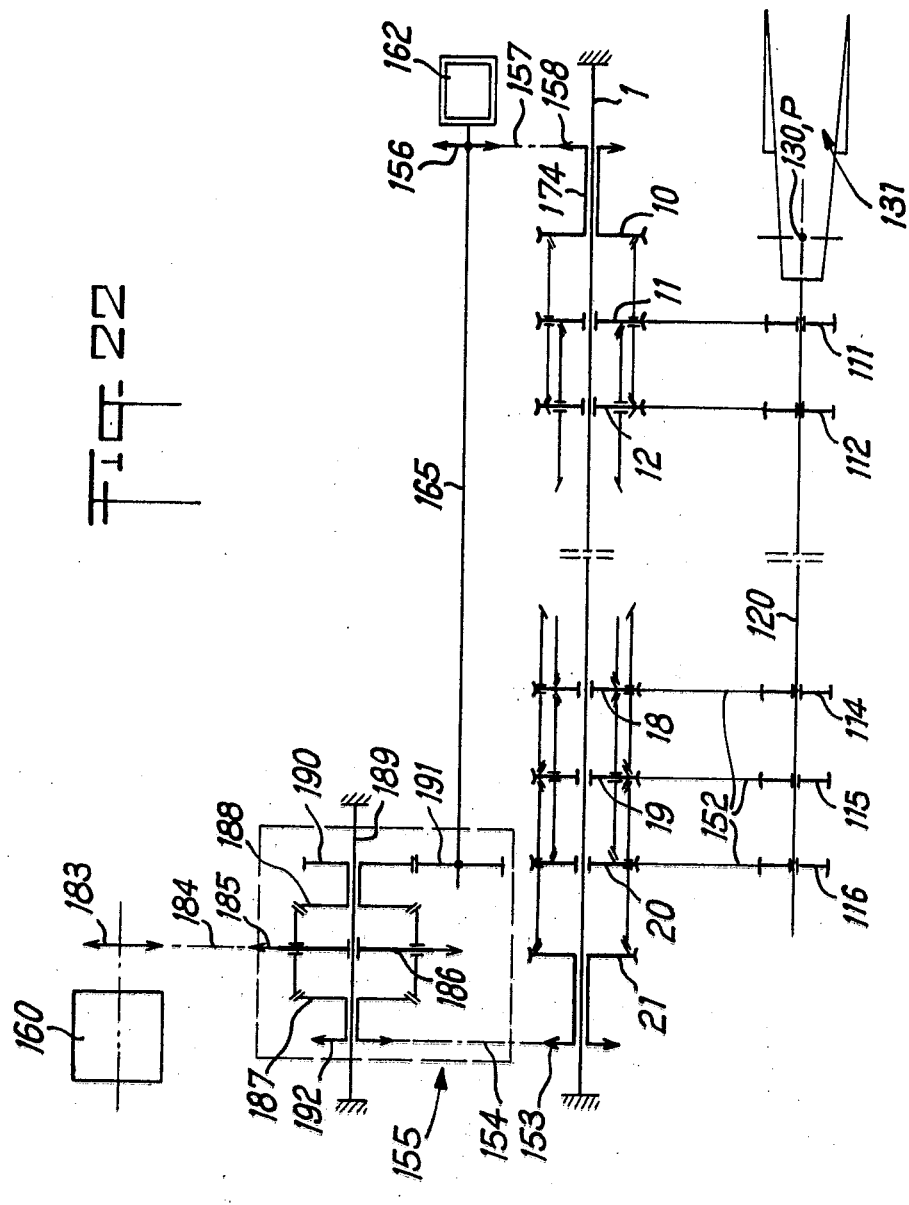

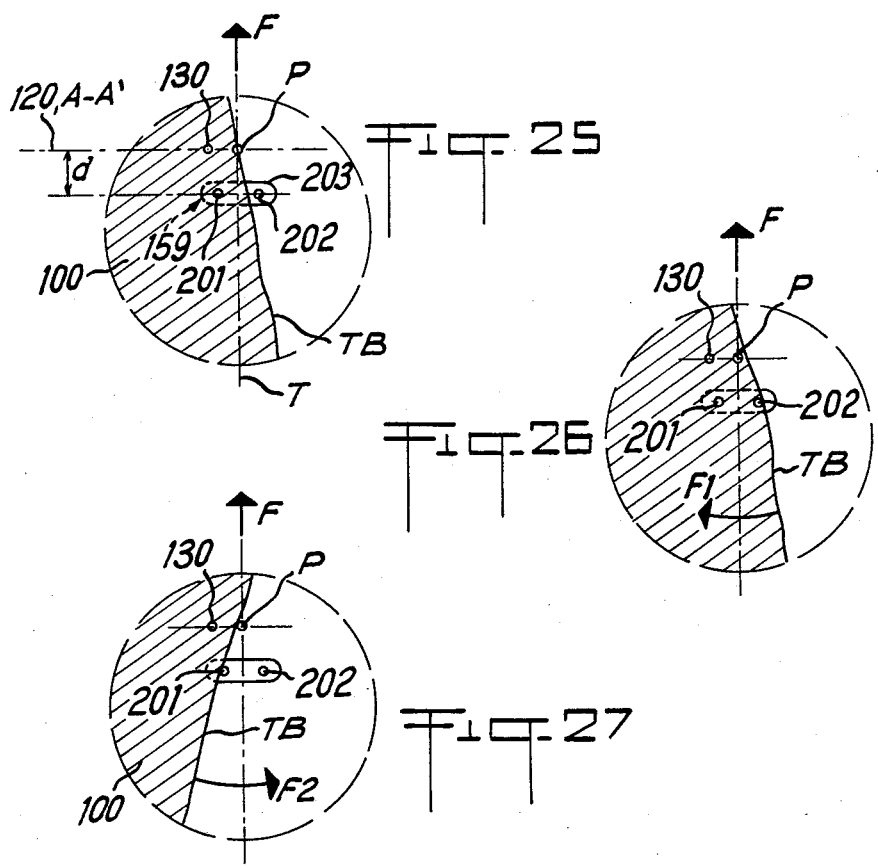

MULTIDIFFERENTIAL DEVICE

BACKGROUND OF THE INVENTION

The present invention relates to a multidifferential device of the type comprising a plurality of differentials, each comprising a differential holder with at least two epicyclic gears and two planetary gears and having an imaginary rotation axis which is the same for all the differential holders and planetary gears. The differential holders and planetary gears are designed as rotary members, whereof two serve as input members and one serves as the output member and which comprise two end members in which an end input or output member is constituted as a planetary gear. The epicyclic gears of every other intermediate differential holder member are located at the same radial level relative to the said rotation axis. A plurality of intermediate differential holder members each comprises an external or internal planetary gear path on both of its faces and at least one inner or outer epicyclic gear in which each end member comprises a planetary gear.

Herein the term planetary gear path designates both teeth and a surface permitting rolling friction or any other equivalent member.

A multidifferential device of the type indicated hereinbefore is known from French Pat. No. 1,299,051. In the case of the known multidifferential device there is only one output member and among all the rotary members acting as planetary gears and/or differential holders only three members can be input or output members, with the supplementary restriction that two of these members are necessarily input members. Therefore, the known multidifferential device does not make it possible to have multiple movement outputs each supplying an output speed proportional both to the speeds of the two input members and equal to half the sum of the speeds of the two adjacent members.

SUMMARY OF THE INVENTION

The problem of the present invention is to eliminate these disadvantages and provide a multidifferential device comprising a plurality of output members whose rotation speeds have predetermined ratios with the rotation speeds of the two input members, as well as with the rotation speeds of the adjacent members of each output member.

According to the invention, this problem is solved with a multidifferential device of the type mentioned above, such device including at least two output members and each of the members being usable as an input member or an output member; further the aforesaid members idle in rotation but are immobile in axial displacement with respect to the same common support axis. Each intermediate member constitutes at the same time a differential holder and a planetary gear. Each member also comprises, in its peripheral area, a connecting member able to cooperate with a driving or driven member.

As a result of the invention, a multidifferential device is provided, making it possible to simultaneously provide several output speeds which have clearly defined ratios relative to one another and to the output members, in such a way that the said device can be used in gear boxes and in any apparatus in which different zones of the same part have to be simultaneously driven at different speeds, while matched to one another.

The present invention also relates to applying the multidifferential device to an automatic guidance installation for feeding a workpiece along a random but predetermined trajectory to a working point associated with a tool for working thereon. This installation is more particularly provided for the guidance of textile articles, to be assembled by sewing, to a sewing machine equipped with a work table. Such a machine may be of the type having in the work area, on the one hand, a rectilinear member able to impart to that portion of the article located in the area a translational movement in accordance with a predetermined direction and, on the other hand, a detecting device provided upstream of the work point and able to determine the position of a portion of the edge of the work piece relative to the work point. The article is fed to the work point by a drive mechanism which is able to come into contact with the article at several points located on a straight line passing through the work point and perpendicular to the drive direction of the rectilinear drive member. Such a drive mechanism also imparts to the article, in the area of the contact points, a pivotal movement about a point located on the aforesaid straight line and constituting the momentary center of curvature of the portion of the curve which passes (at the considered moment) through the work point and exists or is to be marked or materialized on the said article. The drive mechanism in such systems comprises a plurality of drive rollers, a main drive motor, a reversible auxiliary motor controlled by the detector device and a differential, whereof one of the inputs is mechanically connected to the main drive motor and whose other input is mechanically connected to the auxiliary motor and whereof the output controls one of the drive rollers.

Such an installation is described in German patent application No. 2,356,118. In this case, the workpiece to be transported in accordance with a predetermined path is a piece of leather which is sufficiently dimensionally stable relative to the frictional stresses applied thereto from below by the drive rollers on which it partly rests. Moreover, due to its design, the known installation can have no more than two coaxial drive rollers and does not permit the displacement of pieces, more particularly textiles, whose dimensions often vary greatly as a function of the size of the tensile forces locally applied thereto. It is known, for example, that when making a seam for joining together two textile pieces, the sewing machine always exerts a certain tensile stress on the said pieces, in such a way that they undergo certain non-uniform deformations when they are knitted. This is more particularly significant with respect to jersey cloth and less so in relation to woven material. For this reason, the curved edges of knitted articles, particularly collars and arm-holes of knitted underclothing have hitherto had to be brought manually into contact with other textile pieces, such as a ribbon fitted in the form of a folded knitted hem band, before being introduced into the sewing machine. The manual guidance of the knitted piece and the false hem band for the purpose of joining them upstream of the needle of the sewing machine, without the piece or band being stretched differently from the other article, requires great dexterity and calls for a long apprenticeship on the part of the machine operator.

The invention has, more particularly, the object of eliminating the above disadvantages. There is thus shown an automatic guidance installation of the above type, particularly adapted for an automatic machine for sewing textile articles along concave, convex or straight lines. The adaptation is related to an installation which must be operated in such a way as to ensure automatic guidance and feeding of the textile article, without any deformation of the latter, to a point upstream of the sewing machine needles, in accordance with a predetermined path which, it is noted, can be the contour of the textile article.

According to the invention, this object is achieved by the disclosed guidance installation which includes in the drive mechanism thereof a plurality of pressure and drive rollers arranged above the work table. The rollers are of the same diameter, mounted so as to idle in rotation and at equal distance from one another on a common shaft whose vertical projection coincides with a straight line which is perpendicular to the direction of the translational movement imparted on the article by the rectilinear drive member and which passes through the work point. The multidifferential device of this invention is equipped with a plurality of output members, each connected kinematically to one of the said rollers as well, two input members, a reversing device placed between the main motor and the second input member, as well as a single auxiliary differential. One planetary gear input of the auxiliary differential cooperates with the output of the reversing device; the planetary gear output thereof cooperates with the second input member of the multidifferential device; and the differential holder input thereof cooperates with the output of the reversible auxiliary motor. The input member connected to the main drive motor is located, at least approximately, in the same vertical plane as the said rectilinear drive member. The detector device comprises two units which emit and receive rays and a reflecting mirror inserted in the work table slightly upstream of the work point and below the said units.

As a result of this design, the area of the workpiece, (e.g., a textile article) located at the moment in question in the zone of the work point of the tool, such as a needle, is displaced in such a way that the successive areas of the article passing through the said work point are located on a narrow band or line which is of predetermined form and which can coincide with that of the border area of the said article, while the textile article is displaced without undergoing deformations in the work area.

BRIEF DESCRIPTION OF THE DRAWING

The invention will be better understood from the following description of several embodiments of the multidifferential device and the application thereof to a guidance installation used more particularly for the guidance of textile articles in front of the needle of a sewing machine, and from the accompanying drawing of which:

FIG. 4 is an elevation view of an axial half-section through the first embodiment of FIG. 3.

FIG. 5 is a front elevation of one of the output members in accordance with the arrow V of FIG. 4.

FIG. 6 is a front elevation of the other output member in accordance with arrow VI of FIG. 4.

FIG. 7 is an axial half-section of a second embodiment of the multidifferential device according to the invention.

FIG. 8 is a front elevation of an output member in accordance with the arrow VIII of FIG. 7.

FIG. 9 is a front elevation of another output member in accordance with the arrow IX of FIG. 7.

FIG. 14 is a schematic plan view of the guidance installation associated with a sewing machine and involving the application of a multidifferential device according to the invention.

FIG. 15 is a part elevation and schematic view of the installation according to FIG. 14.

FIGS. 16 to 20 are schematic illustrations of several displacement and/or pivoting methods for the textile article so that at a reference point P it follows a movement whose different successive movement steps at this point follow a line of predetermined form.

FIG. 21 is a perspective view of the guidance installation and of the sewing machine with its work table.

FIG. 22 is a schematic view of a first embodiment of the drive mechanism and the kinematic connection with pressure and drive rollers.

FIGS. 25 to 27 are schematic illustrations of three alternative possibilities for a detector device associated with the control of the drive mechanism.

DETAILED DESCRIPTION OF THE PREFERRED EMBODIMENT

Figure 1:
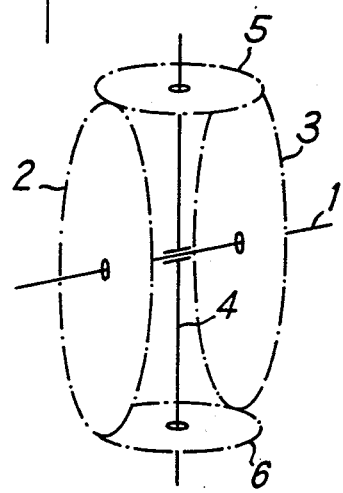
FIG. 1 is a schematic and perspective illustration of a spherical differential of a type known in the prior art.
Figure 2:
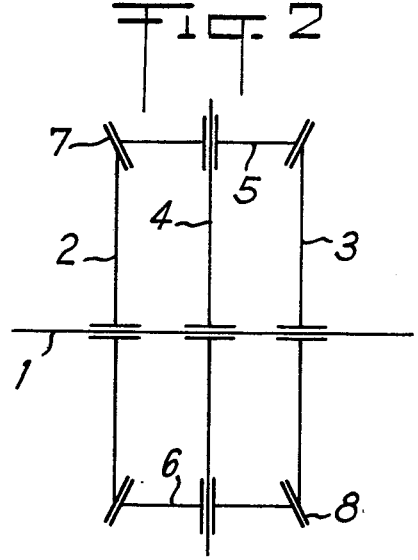
FIG. 2 is a schematic elevation view of the spherical differential shown in FIG. 1.

As can be seen in FIGS. 1 and 2, a so-called spherical differential comprises, on a common shaft 1, two planetary gears 2 and 3 and a differential holder 4 located between the two planetary gears 2, 3, whereby the two epicyclic gears 5 and 6 (constituted for example by conical pinions meshing with one of the conical sets of teeth 7 and 8 of planetary gears 2, 3) which, in the same way as the differential holder 4 are idle in rotation and axially immobile on the common shaft 1.

Figure 3:
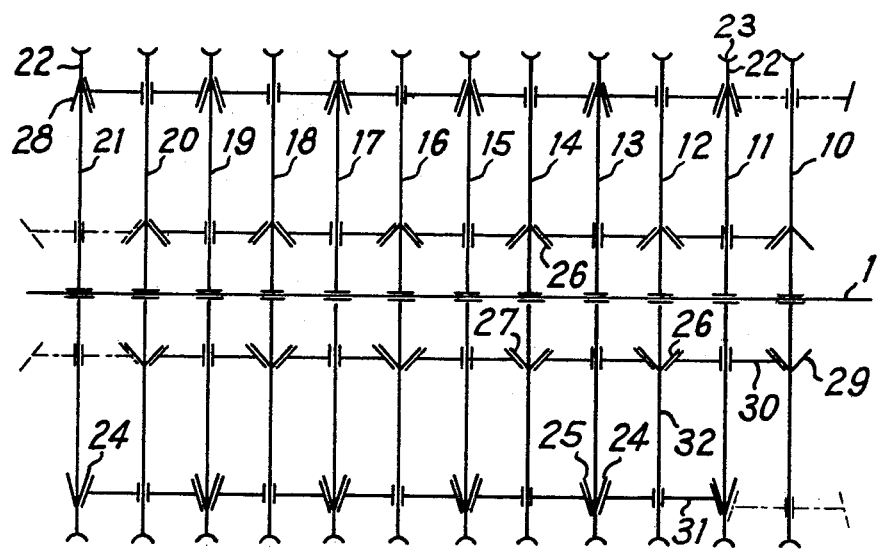
FIG. 3 is a schematic elevation view of the first embodiment of the multidifferential device according to the invention.

According to the invention, as shown schematically in FIG. 3, several spherical differentials are arranged on a common shaft 1 and are interconnected and operated in such a way that a member serving as a planetary gear for the first of the differentials at the same time constitutes a differential holder for the edges and differential partly inserted in the first differential.

The multidifferential device according to FIG. 3 comprises on the common shaft 1 a series of so-called output members 11 to 20, shown in continuous lines, and on either side of this series of output members 11 to 20 a so-called input member 10 or 21 shown with epicyclic gears in broken lines. These various members 10 to 21 are axially immobile but idle in rotation on common shaft 1. Each member 10 to 21 comprises a circular peripheral area 22 provided with a connecting member 23, such as a groove, a friction ring, a toothed rim, etc., able to cooperate with a (not shown) driving member in the case of the input members 10 and 21 or with a (not shown) driven member in the case of the output members 11 to 20. Each $(2m + 1)$th output member 11, 13, 15, 17 and 19 is operated in its peripheral area in such a way as to serve as a so-called external planetary gear and comprises on each lateral face a conical toothed rim 24, 25 having the same radius and an apex located on the common shaft 1 on one or the other side of member 11, 13, 15, 17 and 19, $m$ being equal to zero or an integer greater than zero. Each $(2m + 2)$th output member ($m$ being equal to zero or an integer greater than zero, such as 12, 14, 16, 18 or 20) is operated in the adjacent inner area of shaft 1 in such a way that it also serves as a so-called inner planetary gear. To this end it comprises on each lateral base a conical toothed rim 26, 27 which, like the toothed rims 24, 25 is concentric to shaft 1. Rims 26, 27 of the inner planetary gear are of the same radius and are located in cones having juxtaposed bases and apices located on the common shaft 1 on either side of the corresponding member. In other words, the two lateral sides adjacent output members 11 to 20 alternatively serve as inner or outer planetary gears. Analogously, the input member, e.g., 10, adjacent to an output member of the outer planetary gear type, e.g., 11, is operated in such a way as to serve as an inner planetary gear and comprises (at least on the side turned towards the adjacent output member 11), a conical toothed rim 27 of the same radius as the toothed rims 26, 27 of the output members of the inner planetary gear type 12, 14 16, 18 and 20. Analogously, the second input member 21 acts as an outer planetary gear and to this end comprises a large diameter toothed rim 24, identical to that of output members 11, 13, 15, 17 and 19 because it is adjacent to an output member of the inner planetary gear type. Obviously, for input members 10 and 21, the connecting member 23 can also be replaced by a member which is not located on the periphery of the said members 10 and 21 and can more particularly comprise a conical toothed rim 28 or 29 which is located on the side of the corresponding input member, whereby this side is turned away from the output members 11 to 20 and cooperates with a pinion, not shown.

Input members 10 and 21 and output members 11 to 20 also act as differential holders. Each comprises at least one epicyclic gear and preferably two epicyclic gears 30 or 31, such as pinions, arranged symmetrically relative to the common shaft 1 and rotating about a rotation shaft 32, perpendicular to common shaft 1 and rotatable thereabout.

Obviously, the epicyclic gears 30 or 31 are mounted so as to be axially immobile on rotation shaft 32. When the considered member 10 to 21 is of the so-called outer planetary gear type, such as 11, 13, 15, 17, 19 or 21, the epicyclic gears 30 are mounted on said member in the area located within the toothed rims 24, 25 and preferably in the vicinity of common shaft 1, so as to be able to cooperate with the toothed rims 26, 27 of the adjacent members acting as inner planetary gears, such as 10, 12, 14, 16, 18 or 20. However, when the considered member 10 to 21 is of the so-called inner planetary gear type, such as 10, 12, 14, 16, 18 or 20, the epicyclic gears 31 are mounted on the said member in the peripheral area located externally of the toothed rims 26, 27 and preferably in the vicinity of the periphery of the said member, in such as way as to be able to cooperate with the toothed rims 24, 25 of the adjacent members acting as external planetary gears, such as 11, 13, 15, 17, 19 and 21. Thus, each input or output member is designed both as a planetary gear and as a differential holder; if it is of the outer planetary gear type (e.g., member 11) it is at the same time an inner type differential holder and if it is of the inner type planetary gear (e.g., member 12) it is at the same time a so-called outer differential holder. Thus, in other words, the invention comprises, on the one hand, a juxtapositioning of several differentials mounted on a common shaft and comprising toothed rims of planetary gears and epicyclic gears disposed to two different radial levels relative to the common shaft 1, in such a way that they can be called inner or outer differentials and, on the other, an association of each so-called outer differential with two adjacent inner differentials in such a way that each member rotating about the common shaft 1 is at the same time a planetary gear and a differential holder.

As a result of this arrangement, the rotation speed of a random output member 11 to 21 is dependent on the rotation speeds of the input members 10 and 21 and the positional rank of the said input members and the positional rank of the output member in question within the assembly of all the members 10 to 21. It has been determined that such rotation speed is governed by the following relationship:

$$V_s = V_{E1} + \frac{V_{E2} - V_{E1}}{i} N$$

in which:

$V_s$ is the rotation speed of the considered output member;

$V_{E1}$ is the rotation speed of the first input member of random rank but selected as zero rank;

$V_{E2}$ is the rotation speed of the second input member;

$i$ is the rank of the second input member, said rank being counted from the first input member having zero rank; and N is the rank of the considered output member, said rank being counted from the input member with zero rank, said ranks being counted positively or negatively in accordance with the positions of the considered members on one or other side of the input member of rank zero.

Obviously, the input members 10 and 21 are not necessarily arranged at the ends of the multidifferential device and can also be located between the output members 11 and 20.

If the general relationship is applied to the embodiment shown in FIG. 3 and if output member 17 is selected as a considered output member, input member 10 as the first input member of rank zero, then rank $i$ of the second input member 21 is equal to $+11$ and the rank N of the output member 17 is equal to $+7$, giving the following relationship:

$$V_s = V_{E1} + \frac{V_{E2} - V_{E1}}{11} 7$$

If the rotation speeds of the two input members are constant, the rotation speed of the output member considered will depend only on its rank and that of the second input member.

Hereinafter, several embodiments based on the principle illustrated by FIG. 3 will be described.

The embodiments shown in FIGS. 4 to 6 comprise two input members 10 and 21 which are provided at the ends of the multidifferential device, and three intermediate output members 11, 12, 13, all of said members 10, 11, 12, 13 and 21 being mounted so as to be rotatable on common shaft 1, but axially immobile with respect thereto. Each member 10 to 13 and 21 comprises a circular disc 33, whose periphery is provided with an annular groove 23 which serves as a connecting member; each further has a centre provided with a bearing hole 34 traversed by the common shaft 1. Each disc 3 has a radial bore 34 which serves as a housing for the rotation shaft 32 for the epicyclic gear 30 or 31. Disc 33 for each epicyclic gear 30 or 31 has an opening 35 or 36 which is either located in the vicinity of the disc periphery in the case of an inner planetary gear member such as 10 and 12 or close to the center of the said disc in the case of an outer planetary gear member such as 11 and 13. Opening 35 or 36 extends perpendicular to the rotation shaft 32, traversing the same, and serves as a partial housing for an epicyclic gear 30 or 31. Moreover, each disc 33 is provided on at least one of its lateral faces with a conical toothed rim, such as 24, 25, 26 and 27, concentric to the common shaft 1, and located externally of epicyclic gear 30 (in the case of members 11 and 13) or internally of epicyclic gear 31 (in the case of members 10, 12 and 21,), whereby the intermediate members 11, 12 and 13 carry a toothed rim on each of their lateral faces. In FIG. 4 the straight line 38 indicates the separation in the radial direction between the inner level differentials and the outer level differentials of members 10 to 13 and 21.

The embodiments shown in FIGS. 7 to 9 differ from the previous embodiments due to the fact that in these cases, the epicyclic gear is not constituted by pinions but, rather, by rollers 45, 46, laterally projecting beyond the openings 36, 37 made in the intermediate members 11, 12, 13, 14 and 15 and rotating about rotation shafts 32 extending radially in members 11 to 15 in the form of a circular disc and further being perpendicular to common shaft 1 in bores 35. If these rollers 45, 46 are made from a slightly compressible material, in place of the roller paths provided on the lateral faces of adjacent members, it is possible to directly use the planar lateral faces which then serve as planetary gears, rollers 45, 46 rolling thereagainst with friction and substantially no slipping. Obviously, rollers 45, 46, uniformly distributed in threes on each intermediate output or input member are arranged in two circles, whereby the radii of adjacent members differs but is the same in the case of alternate members. The different members 10 to 15 and 21 idle in rotation on a common shaft and their rollers are brought into contact with the planetary gear paths of adjacent members by means of adjustable bearings 39, 40 which are associated with a cupped washer 43 and a nut 44 fixed to a threaded portion of the common shaft 1.

Figure 10:
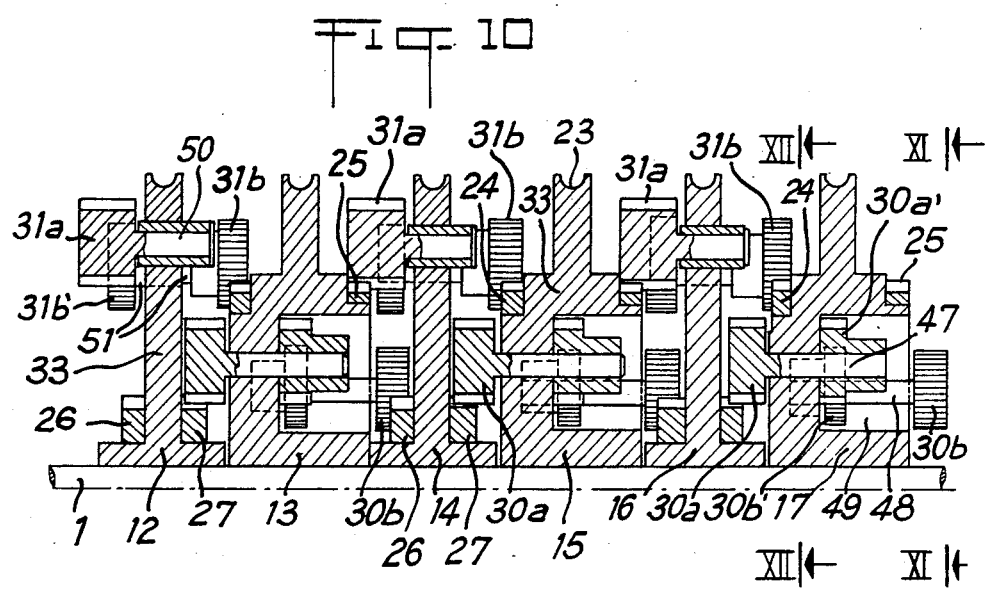
FIG. 10 is a partial axial half-section of a third embodiment of the multidifferential device according to the invention.
Figure 11:
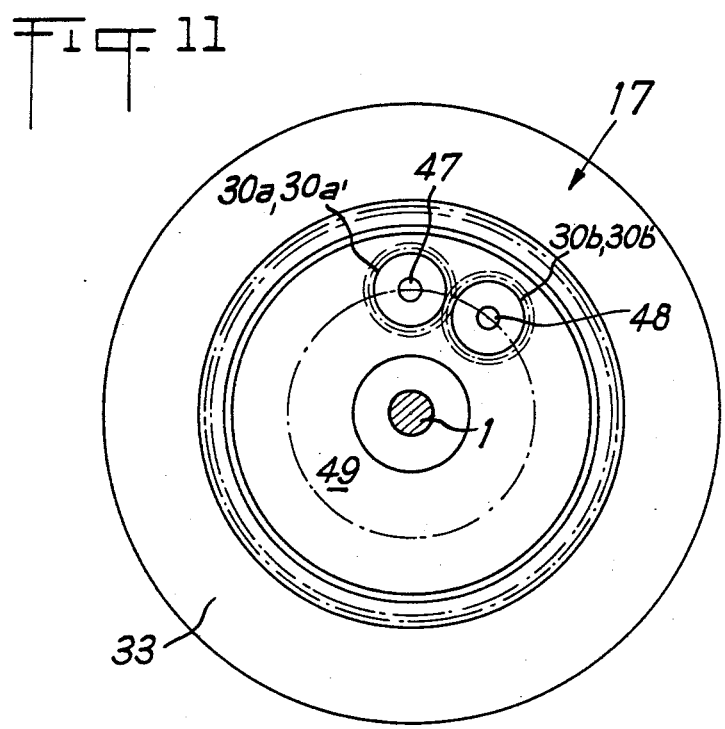
FIG. 11 is a front elevation of an output member in accordance with the arrow XI of FIG. 10.
Figure 12:
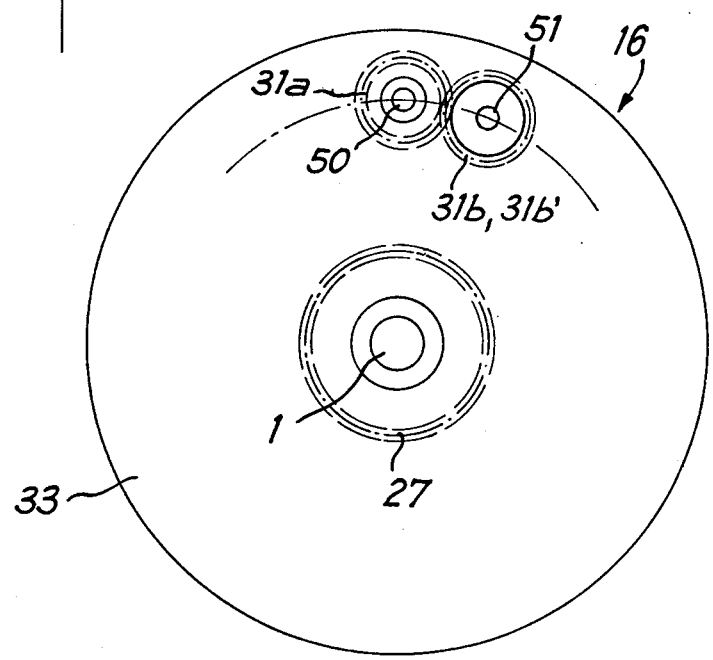
FIG. 12 is a front elevation of another output member in accordance with the arrow XII of FIG. 10.

The embodiments shown in FIGS. 10 to 12 are based on the principle of the spur geared differential. The end members are identical as regards their design to half of the intermediate members and to simplify representation, only certain intermediate members 12, 13, 14, 15, 16 and 17 are shown, whereby each can be an input or an output member. Each intermediate member comprises a circular disc 33 which has on its periphery an annular groove 23 which serves as a connecting member. When the member is designed as an outer planetary gear (such as members 13, 15 and 17) it has on each of its lateral faces and in the vicinity of its periphery a straight-toothed rim 24, 25 with external toothing of the same diameter and arranged concentrically to common shaft 1 whereon are mounted all the input and output members. Close to its centre, the outer planetary gear type member has two spur-geared wheels 30a, 30b whose rotation shafts 47, 48 are mounted on the said disc in such a way as to be angularly displaced relative to one another, being disposed parallel to the common shaft 1 and on the same circle concentric to common shaft 1. The spur-geared wheels 30a and 30b overhang relative to the lateral face of the outer planetary gear members such as 13, 15 and 17. So that the spur-geared wheels 30a, 30b which act as epicyclic gears will rotate in opposite directions from one another, the rotation shaft 45, integral with spur-geared wheel 30a, penetrates via its end opposite to the said wheel 30a a preferably annular lateral slot 49 of disc 33 and carries a reversing spur-geared wheel 30a' identical to the epicyclic gear wheel 30a. The other shaft 48 which is integral with the epicyclic gear wheel 30b is provided with another reversing spur-geared wheel 30b' which is identical to wheel 30b and which meshes with the reversing wheel 30a', or alternatively, the axial extension of the second spur-geared wheel 30b is sufficient for a portion to penetrate into slot 49 and cooperate with the reversing wheel 30a'.

When the member is designed as an inner planetary gear, such as member 12, 14 and 16, the disc 33 of each member has on each of its lateral faces and in the vicinity of the common shaft 1 a straight-toothed rim 26, 27 with external toothing. Rims 26 and 27 are of the same diameter and positioned concentrically relative to common shaft 1. One of them (e.g., 27) meshes with the epicyclic gear wheel 30a of the adjacent member (e.g., 15) and the other rim 26 meshes with the second epicyclic gear wheel 30b of the other adjacent member (e.g., 13). In its peripheral area, the inner planetary gear type member 12, 14 and 16 has on one side an epicyclic gear spur-wheel 31a and on the other an epicyclic gear spur-wheel 31b, whereby these two wheels 31a, 31b have identical characteristics and are mounted each on a shaft 50, 51 located in the disc 33 and arranged parallel to the common shaft 1 on the same circle concentric to the said shaft 1. Shaft 51 extends on the other side of the disc 33 and, facing the epicyclic gear wheel 31a, is integral with a receiving toothed wheel 31b'. Wheels 31a and 31b, for example, of member 14 cooperate respectively with one or the other of the toothed rims 25 or 24 of the two adjacent members 13 and 15.

Figure 13:
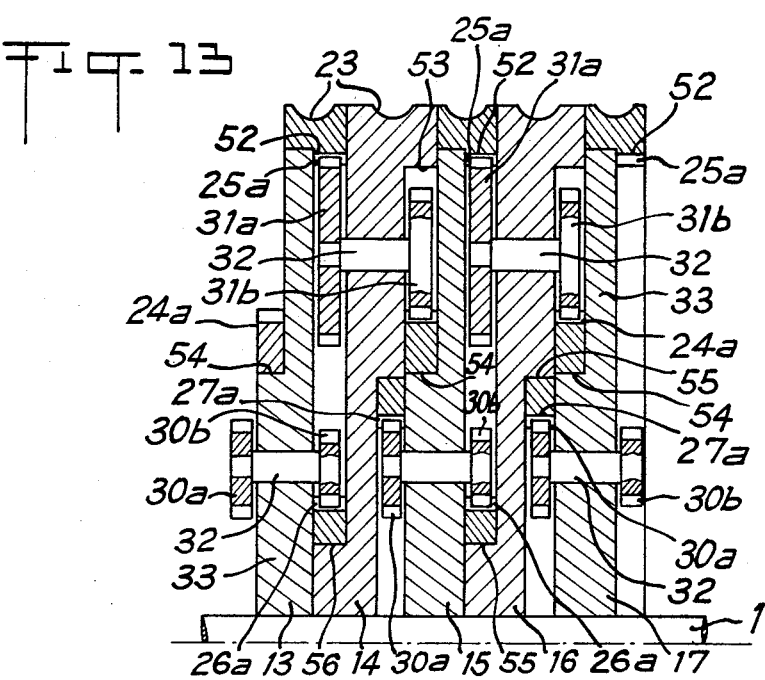
FIG. 13 is a partial axial half-section of a fourth embodiment of the multidifferential device according to the invention.

The embodiment of FIG. 13 is also based on the spur-geared differential, but it utilizes, in part, inner straight-toothed rims, which eliminate the reversing wheel associated with the epicyclic gear wheels of the previous embodiment.

As represented in FIG. 16, each intermediate member 13, 14, 15, 16 and 17 is able to be used as an input or output member substantially comprising a disc 33 which is mounted so as to be rotatable but axially immobile on common shaft 1.

All the members 13 to 17 have on their periphery a connecting member 23, such as a circular groove, and are contiguous, substantially without any significant lateral play in the peripheral area. Moreover, on one of the lateral faces, such as the right hand face shown in FIG. 16, each member has an annular shoulder 52 or 53, slightly set back relative to its periphery. Such shoulder extends toward the other face of the same disc 33 and has a width greater than the width of the epicyclic gear wheel which the shoulder must cover. In the case of an outer planetary gear type member such as 13, 15 and 17, this annular shoulder 52 is internally provided with a toothed rim 25a having a straight inner toothing. However, when it is an inner planetary gear type member, such as 14 and 16, the annular peripheral shoulder 53 only serves to cover and house an epicyclic gear wheel, as will be described hereinafter. On the other face, each disc designed as an outer planetary gear wheel, such as 13, 15 and 17, has, in an intermediate area between its periphery and the common shaft 1, an annular shoulder 54 which is covered by a toothed rim 24a with an outer straight toothing constituting the couterpart of rim 25a. In the area adjacent to the common shaft and inside the toothed rim 24a, 25a, members 13, 15 and 17 are designed as differential holders and to this end have a shaft 32 located parallel to the common shaft 1 in disc 33, i.e., the body of member 13, 15 or 17 and carrying on each projecting end of a lateral face of the corresponding member a toothed wheel 30a, 30b which meshes with a toothed rim of the adjacent member, e.g., 14 or 16. It is also pointed out that the peripheral shoulder 53 of each member 14 and 16 also covers the toothed rim 24a with outer straight toothing of the adjacent member 15, 17.

Each member designed as an inner planetary gear such as 14 and 16 has on the same side as the peripheral shoulder 53 a second inner annular shoulder 55 which is concentric to the common shaft 51, is located in the intermediate area between the periphery of the said member and the said common shaft 1 and is provided with a toothed rim 27a with inner straight toothing which cooperates with the epicyclic gear wheel 30a of the adjacent member, e.g., 15 or 17. The other face member 14 or 16 has, in the vicinity of the common shaft 1, an outer annular shoulder 56 which is covered by the peripheral shoulder 52 of the adjacent member (such as 13 or 15) and which is provided with a toothed rim 26a with outer straight toothing cooperative with the epicyclic gear wheel 30b of the adjacent member 13 or 15 or 17. Viewed in the radial direction externally of the toothed rims 26a and 27a provided on each inner planetary gear type member such as 14 and 16, a rotation shaft 32 is located in the body or disc 33 of the said member and on each end of shaft 32 is keyed a spurgeared wheel 31a, 31b which cooperates with the toothed rim 25a or 24a of one of the adjacent members 13, 15, 17. As above, rotation shaft 32 is parallel to the common shaft 1. It should be noted that in this embodiment one of the epicyclic gear wheels (e.g., 30b, or 31b of each pair of epicyclic gear wheels 30a, 30b and 31a, 31b) associated with a member (e.g., 15 or 16) cooperates with a rim having outer straight toothing, such as 26a or 24a of the adjacent member (e.g., 16 or 17), while the other epicyclic gear wheel (e.g., 30a or 31a) cooperates with the rim having inner straight toothing, such as 27a or 25a of the adjacent member (e.g., 15 or 14). As a result of the different shoulders 52 to 56, the adjacent members are also contiguous, alternately in the intermediate zone between their periphery and the common shaft 1 and in the central zone about common shaft 1. Obviously, the diameters of the toothed rims 24a, 25a, 26a and 27a and those of the epicyclic gear wheels 30a, 30b, 31a, 31b are matched to one another so that the wheels of one pair of epicyclic wheels do not transmit to the shaft thereof any significant torsional moment.

The object of the invention constitutes a basic drive unit which can more particularly be used in gear boxes with multiple ratios and in the devices which must simultaneously provide several outlet speeds having clearly defined ratios between them.

Obviously, the multidifferential device of the present invention can undergo a certain number of modifications which fall within the scope of the skilled expert without passing beyond the scope of the invention as defined in the claims below. Thus, in place of rollers 46 it is possible to use balls mounted in the different discs 10 to 21. The invention, more generally relates to any multidifferential device comprising a system of rotary members, juxtaposed on the same shaft and constituted by associating the constituent parts of several differentials in such a way that the rotation speed of each member corresponds to the arithmetic mean of any two random members symmetrical thereto or also to a device in which the speed difference between each member is identical.

Thus, such a device comprising $n$ members has two inputs and $(n-2)$ outputs, whereby the number of the said members is not limited.

Each member can be used as desired as either an input member or an output member and the rotation speed of one of the input members can be made zero by immobilizing the same.

The application of the multidifferential device according to the invention to the automatic guidance of an article will now be described.

FIGS. 14 and 15 schematically show an installation for automatically guiding an article in front of a work point. The article can be of textile nature, such as a knitted article, and the working tool can be constituted by the needle of a sewing machine. The automatic guidance installation according to the invention will be described combined with a sewing machine used for joining together textile articles.

Before describing the constitution of the automatic guidance installation, the fundamental considerations on which the present invention is based will be briefly indicated.

Consideration will be given to a textile article 100 with a planar surface S defined by an edge of random profile 101 having both concave edge portions and convex edge portions and, if applicable, also straight edge portions. A reference point P will be assumed in front of which will successively pass all the points of the edge 101 of the textile article 100. Article 100 must be moved to the reference point P in a direction F which passes through the reference point P and which is tangential to the edge portions TB located, at the considered moment at the reference point P. The edge portion TB has a center of curvature O and a radius of curvature R. The center of curvature O can be located on one or other side of the reference point P relative to the tangent T to the border portion TB at the reference point P. In order to make edge portion TB pass in front of the reference point P, it is merely necessary to pivot the textile article 100 about the centre of curvature O at the considered moment. Thus, all the points located on the textile article 100 and on a straight line passing through the center of curvature O and the reference point P, i.e., on a straight line perpendicular to tangent T pivot at the same time as edge portion TB about the momentary centre of curvature O. In FIG. 14 the straight line passing through the points P and O and perpendicular to the tangent T is designated by the reference A—A'. All the points located both on this line A-A' and on the textile article 100 and, in general terms, all the points located on the textile article 100 in a zone defined by the edge portion TB and by the straight lines passing through the center of curvature O and by the ends of the edge portion TB pivot about the centre of curvature O when the edge portion TB is made to pass in front of the reference point P. Considering three points $C_1$, $C_2$, $C_3$ located both on the straight line A-A' passing through the reference point P and through the momentary centre of curvature O as well as on article 100, the spacing between two adjacent such points is equal to D, determined by the spacing between the reference point P and the adjacent point $C_1$. The displacement path of these points $C_1$, $C_2$, $C_3$ are circles which are concentric to the edge portions TB and which have the same center O. The radius of curvature of these circular portions is equal to $R_1$, $R_2$ and $R_3$, respectively. If at the reference point P, the edge portion moves at angular speed V, points $C_1$, $C_2$ and $C_3$ move at proportional angular speeds, namely $V_1$, $V_2$ and $V_3$, respectively.

It is thus possible to write the following relationships:

$$V_1 \, V \times \frac{R_1}{R} : V_2 = V \times \frac{R_2}{R} : V_3 = V \times \frac{R_3}{R}$$

In view of the mutual spacing D between two adjacent points, such as C and $C_2$, it is also possible to write the following relationships:

$$V_1 = V(1 + \frac{D}{R}) : V_2 = V(1 + \frac{2D}{R}) : V_3 = V(1 + \frac{3D}{R})$$

Thus, in view of these relationships, it can be seen that a considered point, such as point $C_2$ moves at a speed which is equal to half the sum of the speeds of the adjacent points, such as $C_1$ and $C_3$ and spaced therefrom by a distance D and located on the straight line passing through the reference point and through the center of curvature O.

FIGS. 16 to 20 show a certain number of possible configurations for the curved portion located in the area of the reference point P and the mutual positionings of the reference point P, centre of curvature O and points $C_1$, $C_2$, $C_3$ located on the straight line A-A', perpendicular to the tangent T at point P and spaced from this reference point P by the distance equal to D or a multiple of D. It is further pointed out that the radii of curvature located on the line A-A' and directed from A' towards A are considered as negative radii, while the radii directed in the opposite direction are considered as positive radii. This is necessary for the calculation of the angular speeds of the different points $C_1$, $C_2$, $C_3$ about the centre of curvature O.

The curved portion passing through the reference point P has a radius of curvature R, equal to D in the case of FIG. 16. The centre of curvature O is located to the right of reference point P as in the case of FIG. 14. However, in the case of FIG. 17 the center of curvature O of the curved portion passes through the reference point P and is located to the left of this reference point, whereby the radius of curvature R is equal to half the distance D separating two adjacent points of $C_1$, $C_2$ and $C_3$. In accordance with the example indicated in FIG. 18, the center of curvature O is located to the left of the reference point P, and the radius of curvature R of the edge portion considered TB is equal to 2D. In the case of FIG. 19, the radius of curvature R of the curved portion TB located in the zone of the reference point is equal to 4D and the center of curvature is located to the left of the reference point P. As can be seen in FIG. 20, the edge portion considered is a straight line coinciding with the tangent T at reference point P and, consequently, the radius of curvature is infinite. In this case the displacement path of points $C_1$, $C_2$, $C_3$ is rectilinear and not curved as in the previous example.

In the case of all the examples indicated hereinbefore, it has been found that if a point located in the vicinity of the reference point P on the edge portion TB moves at a speed V in the direction of and substantially following the tangential portion T located in the immediate vicinity of reference point P, then points $C_1$, $C_2$, $C_3$, etc. located on the straight line A-A' perpendicular to the tangent T at a distance from the reference point P equal to D or a multiple of D move at speeds proportional or equal to V. If the speeds $C_1$, $C_2$, $C_3$, etc. are proportional to the speed V, they can be higher or lower than speed V. Moreover, as indicated with reference to the example of FIG. 14, it has been found that in all cases, with the exception of that of FIG. 20, the angular speed of a considered point (e.g., $C_2$) is equal to half the sum of the angular speeds of the adjacent points located on the straight line A-A' and spaced therefrom by a distance equal to D (e.g., points $C_1$ and $C_3$).

In view of these considerations, it is proposed according to the invention to use a certain number of equal diameter pressure and drive rollers 111 to 116, whose contact points with the textile article 100 are represented by points $C_1$, $C_2$, $C_3$. Moreover, these rollers are located above the work table 112 and idle in rotation on a common shaft 120, whose vertical projection coincides with the straight line A-A'. In view of the fact that points $C_1$, $C_2$, $C_3$ are spaced from one another by a distance D, the spacing between adjacent rollers 111 to 116 is also equal to D. Moreover, the reference point P is situated in the immediate vicinity of the needle 130 of a sewing machine 131. Obviously, the common shaft 120 for all the rollers 111 to 116 is located in the same vertical plane as the needle 130, this vertical plane being at the same time the plane of symmetry of the body of the sewing machine 131 and perpendicular to the work table 132 of the sewing machine, as well as to the displacement direction of the textile article 100 in the vicinity of the reference point P and the needle 130, whereby the said displacement direction is indicated by the arrow F. In view of the fact that the seam must be located slightly inside the edge of the textile article 100 there is a small distance between the reference point P and the vertical projection of needle 130. However, the horizontal distance between the reference point P and the vertical projection of needle 130 is sufficiently small relative to the distance D that it can be considered in practice that the reference point P and the vertical direction of the needle 130 coincide. All the pressure and drive rollers 111 to 116 by gravity on the work table or are brought against the said work table with a relatively small elastic force.

The distance between the roller 111 adjacent to the reference point P and the latter is also equal to the distance between the said roller 111 and the vertical projection of needle 130. One or more dogs 133 penetrate an opening in the work table 132 as from the lower face thereof and ensure the tangential feed of the edge portion TB, located in the zone of reference point P, i.e. of needle 130 with a constant average speed V.

It has already been shown that the pressure and drive rollers 111 to 116 must rotate at a speed proportional to the feed speed V at the reference point P. It is pointed out also that the feed dog 133 must be assimilated with a pressure and drive roller and that the assembly of rollers 111 to 116, including dog 133 or its corresponding roller must rotate at clearly defined speeds relative to the speed V of dog 133 and that these speeds all comply with the relationship:

$$V_N = \frac{V_{(N-i)} + V_{(N+i)}}{2}$$

in which:
$V_N$ represents the rotation speed of the considered roller or the dog 133;
N represents the rank of this roller in the system 111 to 116, including dog 133 which occupies rank 1;
$N-i$ and $N+i$ represent ranks of adjacent rollers symmetrical to the rollers or to the dog of rank N; and
$V_{(N-i)}$ and $V_{(N+i)}$ are the speeds of adjacent rollers symmetrical to the rollers of rank N.

The automatic guidance installation according to the invention therefore has a drive mechanism indicated by the overall reference 150 and able to drive pressure and drive rollers 111 to 116 at speeds which correspond to the above-mentioned relationships. One of the devices forming this drive mechanism 150 is a multidifferential device 151, such as described hereinbefore with reference to FIGS. 3 to 13.

As can be seen in FIG. 3 showing the multidifferential device used in the drive mechanism 151, several spherical differentials are arranged on the common shaft 1 and are interconnected and arranged in such a way that a member serving as a planetary gear for the first of these differentials at the same time constitutes a differential holder for the adjacent differential partly incorporated in the first differential.

The multidifferential device has already been described in conjunction with FIG. 3 so that hereinafter only those means necessary for its application to the drive mechanism of a guidance installation will be described. The different input or output members 10 to 21 are mounted in axially immobile manner but idle in rotation on common shaft 1, at a distance D from one another. Each member 10 to 21 is arranged in one of the vertical planes passing through rollers 111 to 116 and dog 133 and comprises a circular peripheral zone 22 having a connecting member 23 (such as a groove, friction ring, toothed rim, etc.) able to cooperate with a driving member, in the case of the input members 10 and 21, or with a driven member, in the case of output members 11 to 20, which are connected by a belt 152 to a pressure and drive roller 111 to 116.

Obviously, in the case of the input members 10 and 21, the connecting member 23 can be replaced, not only by a member which is not located on the periphery of the said members 10 and 21, such as a conical toothed rim 28 or 29 arranged on the side of the corresponding input member (said side being turned away from the output members 11 to 20 and cooperating with a pinion which is not shown in FIG. 3), but also by a chain wheel 153 receiving its movement from a chain 154 connected to a single differential 155 (FIG. 22) whose function will be explained hereinafter.

As explained hereinbefore, the multidifferential device 151 comprises on the one hand a juxtapositioning of several differentials mounted on a common shaft and comprising toothed rims of planetary gears and epicyclic gears arranged at two different radial levels relative to the common shaft 1 in such a way that they can be called inner or outer differentials and on the other of the association of each so-called outer differentials with two adjacent and so-called inner differentials in such a way that each member rotating about the common shaft 1 is at the same time a planetary gear and a differential holder.

It must be remembered that as a result of this arrangement, the rotation speed of a random output member 11-20 depends on the rotation speeds of the input members 10, 21 and on the positional rank of the said input members and on the positional rank of the considered output member, such as to be determined by the previously indicated relationship:

$$V_s = V_{E1} + \frac{V_{E2} - V_{E1}}{i} N$$

in which the different reference letters have the same meanings as those of the relationship described relative to FIG. 3.

If the rotation speed of one of the input members is constant, the rotation speed of the considered output member is only dependent on its rank and on the rank of the second input member as well as on the rotation speed of the second input member. Thus, within the scope of the present embodiment, it is proposed to rotate the first input member associated with the reference point P (i.e., needle 130) with a constant peripheral speed corresponding to the average feed speed on dog 133; that is, at the displacement speed of the textile article 100 with respect to the reference point P, and to rotate the second input member with a rotation speed which is such that all the successive edge portions of the textile article 100 pass through the reference point P.

To this end, the motor of the sewing machine 131 acting on dog 133 is connected via a toothed wheel and chain drive to the first input member 10 of the multidifferential device 151, said first input member 10 being located in the vertical plane passing through the reference point P and perpendicular to the common shaft 1 and to the common shaft 120 of rollers 111 and 116. Obviously, the ratio of the chain drive 156, 157, 158 is selected in such a way that the peripheral speed of the first input member is identical to the feed speed of the dog 133. For driving the second input member 21 which is located in one of the planes perpendicular to the common shaft 1 and passing through one of the end rollers 115 or 116 or possibly through a plane perpendicular to the common shaft and spaced from that passing through the final roller 116 by a distance equal to D, numerous possibilities exist. However, this drive is still controlled by the position of the edge upstream and the immediate vicinity of reference point P. To this end, the automatic guidance installation also comprises a detector device 159, such as an optical detector device able to act on an auxiliary motor 160, which via a simple differential 161 controls the second input member of the multidifferential device 151 and which receives its second input movement from the main motor 162 of the sewing machine 131. These various functional connections are indicated schematically in FIG. 14 for lines 163 (connection between detector device 159 and auxiliary motor 160, 164 (connection between the differential 161 and the second input 21 of the multidifferential device 161) and 165 (connection between the main motor 162 and the second input of the single differential 161, whose other input is controlled by the auxiliary motor 160).

In FIG. 21, it can be seen that the automatic guidance installation has on the work table 132 supporting arms 166, 167 for the drive mechanism system 150 comprising the multidifferential device 151, the auxiliary motor 160 and the single differential 155. On the casing 168 of drive mechanism 150 is mounted a system of arms 171, 172, 173 forming part of the lifting device 170, integral with casing 168 and able to pivot about the common shaft 1 of the multidifferential device 151. This lifting device 170 also makes it possible to supply and regulate the application force with which the rollers 111 to 116 are moved in the direction of the work table 132. Level with the output members of the multidifferential device 151, i.e., level with the pressure and drive rollers 111 to 116, casing 168 has slots 169 for the outlet of connecting belts 152 which are partly located in the peripheral grooves of rollers 111 to 116 and in the grooves 23 of the output members 11 to 20 of the multidifferential device 151. Shaft 120 of rollers 111 to 116 is mounted in pivotal manner on the common shaft 1 of the multidifferential device 150 with the aid of supporting rods 121, below which passes the transverse arm 173 of the lifting device 170. FIG. 21 also shows that the main motor 162 for the sewing machine 131 acts both via the shaft of pulley wheel 156 on the drive of needle 130 and via belt 156 and pulley 158, as well as a shaft or shaft coupling 174 on the first input member 10 of the multidifferential device 151. FIG. 21 further shows feelers 181 and 182 mounted on the frame of the sewing machine 131 on either side and both upstream and downstream of needle 130 for controlling the starting and stopping of the main motor 162. Feeler 181 starts up the motor 162 as soon as it establishes the presence of textile article 100, while feeler 182, located downstream of needle 131 brings about the stoppage of main motor 162, when the latter has been started, when there is no textile article 100 in its vicinity.

Figure 23:
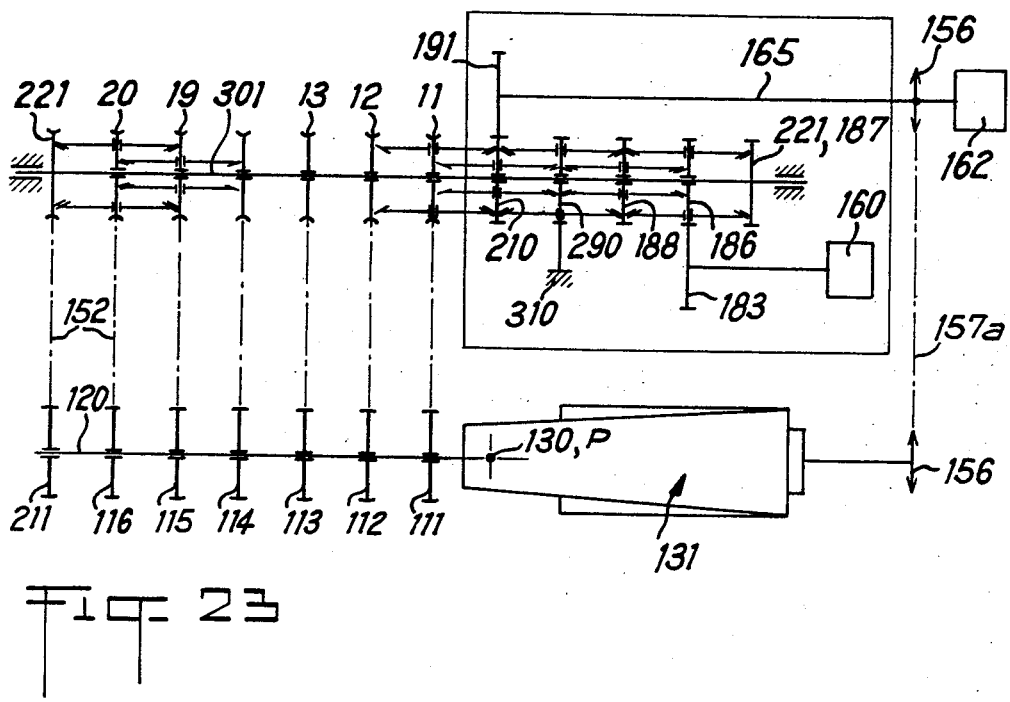
FIG. 23 is a schematic view of a second embodiment of the drive mechanism for the pressure and drive rollers of the guidance installation.
Figure 28:
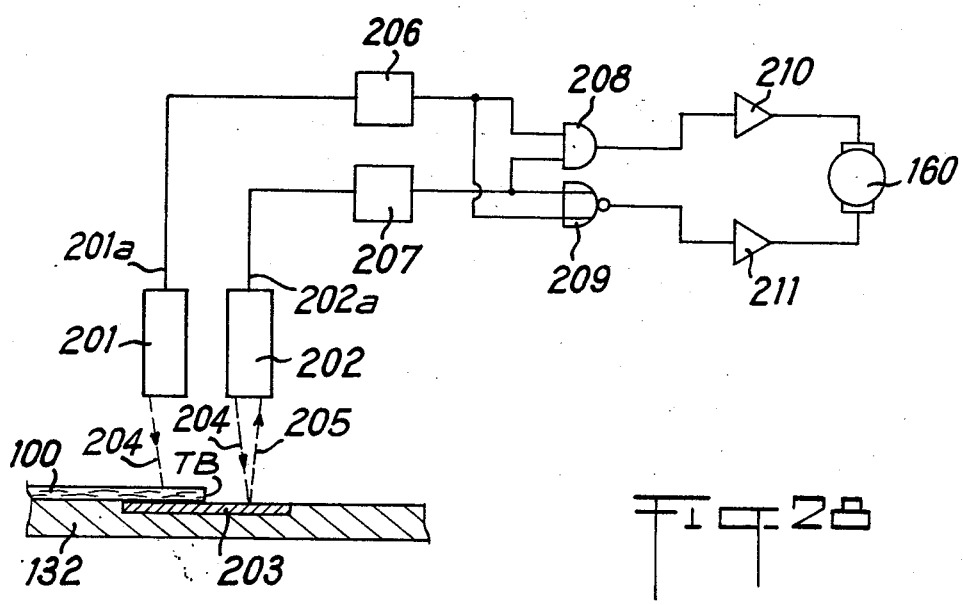
FIGS. 28 and 29 are synoptic views of two embodiments of a control circuit of an auxiliary motor of the drive mechanism, said circuit being associated with the detector device.
Figure 24:
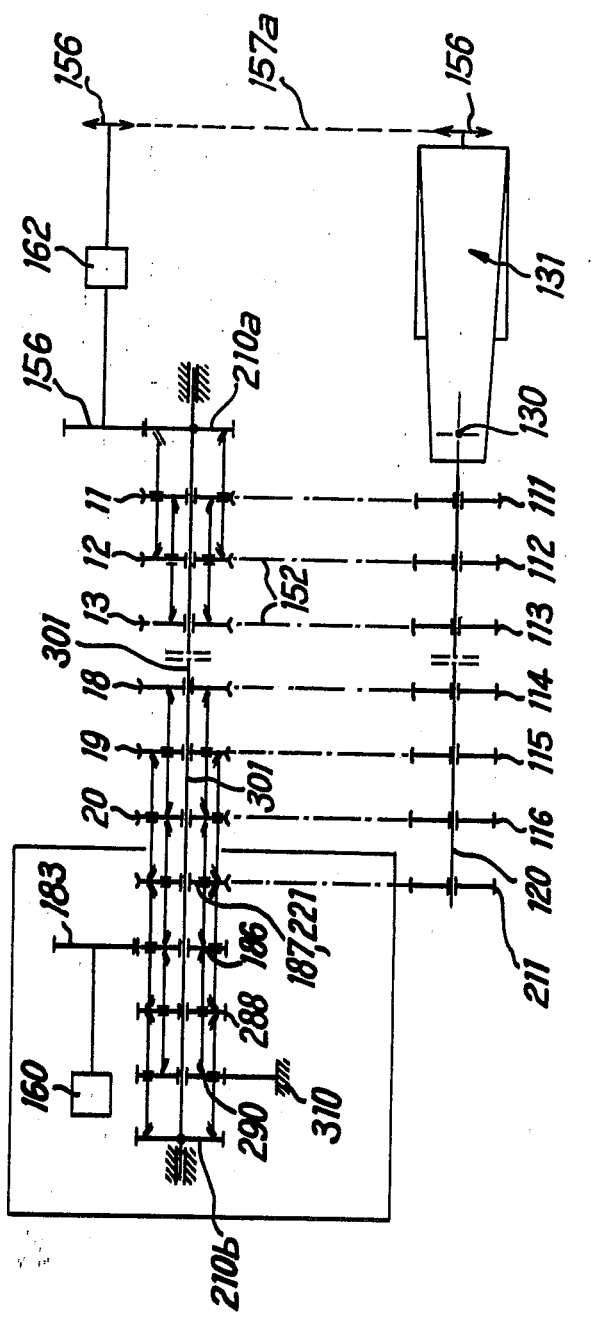
FIG. 24 is a schematic view of a third embodiment of the drive mechanism for the pressure and drive rollers of the guidance installation.

For ease of representation, the epicyclic gears mounted in the multidifferential device 151 or on the other multidifferential devices have only been shown in part in FIGS. 22 to 24. However, the planetary gears or differential holders serving as input or output members are still shown.

FIG. 22 shows that the auxiliary motor 160 is connected via a pulley 183 and a belt 184 to the pulley 185 integral with the outer periphery of the differential holder 186 of the single differential 155. Differential holder 186, as well as the two planetary gears 187 and 188 associated with the said differential holder 186 are mounted so as to rotate freely on the same supporting shaft 189. Between the input planetary gear 188 of the single auxiliary differential 155 and the output shaft 165 of the main motor 162 is provided a movement reversing device comprising, for example, two reversing pinions 190 and 191, one of which (190) is integral with planetary gear 188 and cooperates with the other reversing pinion 191 keyed on the output shaft 165 of the main motor 162. The second planetary gear 187 of the single differential 155 serves as the output and is integral with a chain wheel 192 or an analogous member connected by a chain 154 to the chain wheel 153 mounted on the common shaft 1 and integral with the second input member 21 of the multidifferential device 151. This drawing clearly shows that the first input member 10 is located in the same vertical plane as the needle 130 and that with each pressure and drive roller 111 to 116 is associated an output member 11 to 20, whereof each is located in the same vertical plane as the corresponding roller. This plane is also perpendicular to the common shaft 1 and to the shaft 120. On abstracting the transmission ratios existing between pinions 191 and 190 on the one hand and the pulleys 183 of the auxiliary motor 160 and the pulley 185 of the differential holder 186 or, if it is accepted that this transmission ratio is equal to 1, the single differential 155 combined with the reversing pinions 190 and 191 provides an output speed which is equal to the sum of the speed of shaft 165, the output shaft of the main motor 162, and double the rotation speed of the auxiliary motor 160. In accordance with the embodiment shown in FIG. 22, the auxiliary motor operates intermittently in one or other direction. The speed VMA of the auxiliary motor is chosen as a function of the value R of the smallest radius of curvature of the edge which it is desired to guide level with the reference point. Thus, for the value $r$ the relationship $VMA = (L \times VMP/2r)$, in which is the distance separating the drive members and VMP is the speed of the main motor.

As indicated hereinbefore, the automatic guidance installation also comprises a detector device 159, preferably an optical detector device, operated so as to control the drive mechanism 150 and, more particularly, in such a way that it can act on the electricity supply circuit of the auxiliary motor 160. As shown in FIGS. 25 to 28 the detector device 159 substantially comprises two infrared ray emitting and receiving units 201 and 202, as well as a reflecting mirror 203. Mirror 203 is incorporated in work table 132 slightly upstream of reference point P and extends on either side of Tangent T. The two emitting and receiving units 201 and 202 are arranged above the said mirror and symmetrical relative to the tangent T, which is also perpendicular to axis A-A' or 120, whose projection passes through the needle 130 and reference point P. Preferably, the vertical plane passing through the centres of the two units 201 and 202 is located at a distance from the axis 120 passing through the reference point P, that is at a distance greater than the spacing between units 201 and 202 and preferably approximately equal to double this spacing, in order to be able to anticipate the putting into operation of the auxiliary motor and thus compensating for the response times of the mechanical members.

The constitution of the said emitting and receiving units 201 and 202 is known per se, so that there is no need to describe them in detail here. However, it is pointed out that each unit comprises a source permitting the emission of a beam of infrared rays 204 which is very slightly inclined relative to the vertical axis of the corresponding unit, as well as a collecting unit arranged at a suitable point so as to be able to receive the rays 205 reflected by mirror 203 and previously emitted by unit 201 or 202.

It is to be understood that if a textile article 100, more particularly the edge portion TB, is located between a unit 201 or 202 and the mirror 203, the rays 204 emitted by the unit are not reflected towards the collecting member of the corresponding unit. Each emitting and receiving unit 201 and 202 is arranged in such a way as to be able to transmit a signal at its output 201a and 202a when its collecting member receives reflected rays 205. The output 201a, 202a of each unit 201, 202 is connected to the input of a threshold device 206, 207 which only transmits an output signal when the signal received is sufficiently strong and corresponds to a reflection of the incident rays by the mirror 203 without any interpositioning of the textile article 100. The outputs of the threshold devices 206 and 207 are each connected on the one hand to one of the inputs of an AND gate 206 and on the other to one of the inputs of a NOR gate 209. The output of the AND gate 208 and of the NOR gate 209 are each connected respectively to the input of amplifiers 212, 213 whose outputs are connected either to an energizing circuit of the auxiliary motor 160 for engaging the forward gear of said motor or to an energising circuit of the auxiliary motor 160 for engaging the reverse gear of said motor. It is to be understood that if the motor 160 receives no signal through one of its two amplifiers 212 and 213 it remains stopped or is stopped. The AND gate 208 transmits an output signal when there are simultaneously signals at its two inputs and the NOR gate 209 transmits an output signal when there is simultaneously no signal at its two inputs.

In the area of reference point P and of detector device 159, the guidance installation functions as follows: It is to be remembered that textile articles are driven in the direction of arrow F by the dog 133 level to reference point P (FIG. 25). When the edge portion TB is located between the vertical axes of the two emitting and receiving units 201 and 202, only unit 202 receives a beam of reflected rays 205 with an intensity sufficient that the signal transmitted at its output 202a and applied to the threshold device 207 is powerful enough for the latter to in turn transmit an output signal. However, the beam of rays 204 emitted by unit 201 is largely intercepted by the edge portion TB of textile article 100, in such a way that mirror 203 can only reflect an insignificant quantity of light; as a result, unit 201 transmits a signal which is insufficient to excite the threshold device 206, whose output remains without a signal. Therefore, neither the AND gate 208 nor the NOR gate 209 transmits an output signal, causing the auxiliary motor 160 to remain stopped. The edge portion TB is therefore displaced in a direction parallel to the arrow F (FIG. 25).

If during this displacement in accordance with arrow F, the edge portion TB is also interposed in the path of the beams of rays 204 emitted by the second unit 202, the receiving member for the latter is also hidden by the textile article 100 in such a way that neither unit 201 nor unit 202 transmits a signal which is sufficient to excite the corresponding threshold device 206 and 207. Consequently, the NOR gate 209 concurrently has no signal at either of its inputs and therefore transmits and output signal which, via amplifier 213 causes the starting up of the auxiliary motor 160 in the reverse direction. This starting up of auxiliary motor 160 in the reverse direction finally leads to a pivoting of edge portion TB about a point O, located on axis A-A' at a distance from the reference point P equal to $L \times VMP/2VMA$ in a clockwise direction in accordance with arrow $F_1$ (FIG. 26). This pivotal movement results in edge portion TB no longer hiding the incidence zone of the beam of rays 204 emitted by unit 202 so that the collecting member for the latter again receives the beam of reflected rays 205.

Thus, at one of its inputs, the NOR gate 209 receives a signal which, therefore, eliminates its outer signal. Thus, the reverse running of the auxiliary motor is stopped and the textile article 100 is only moved in the direction of arrow F in the zone of edge portion TB. If the edge portion is displaced not only from the incidence zone of the beam of rays 204 emitted by unit 202, but also from that emitted by unit 201 (cf FIG. 27) the collecting member of unit 201 also receives a beam of reflected rays. Therefore, the two threshold devices transmit a signal and the AND gate 208 which receives these two signals simultaneously, then transmits an output signal which, via amplifier 212, controls the forward running of auxiliary motor 160. This starting of the forward running of auxiliary motor 160, with respect to reference point P, leads to a pivoting of edge portion TB of textile article 100 in the direction of arrow $F_2$ about point O. When, as a result of this pivoting, the incidence zone of the beam of rays emitted by unit 201 is again hidden by the edge portion TB of textile article 100, one of the inputs of the AND gate 208 no longer receives a signal and the auxiliary motor 160 is stopped. As the position of units 201 and 202 is selected so as to compensate for the response times of the various mechanical members, it is not indispensible to provide a time lag for controlling the auxiliary motor. Edge portion TB is positioned substantially halfway between the vertical projections of the vertical axes of units 201 and 202. The distance between units 201 and 202 can be relatively small (e.g., about 2mm), which leads to sufficiently precise positioning of the edge.

Figure 29:
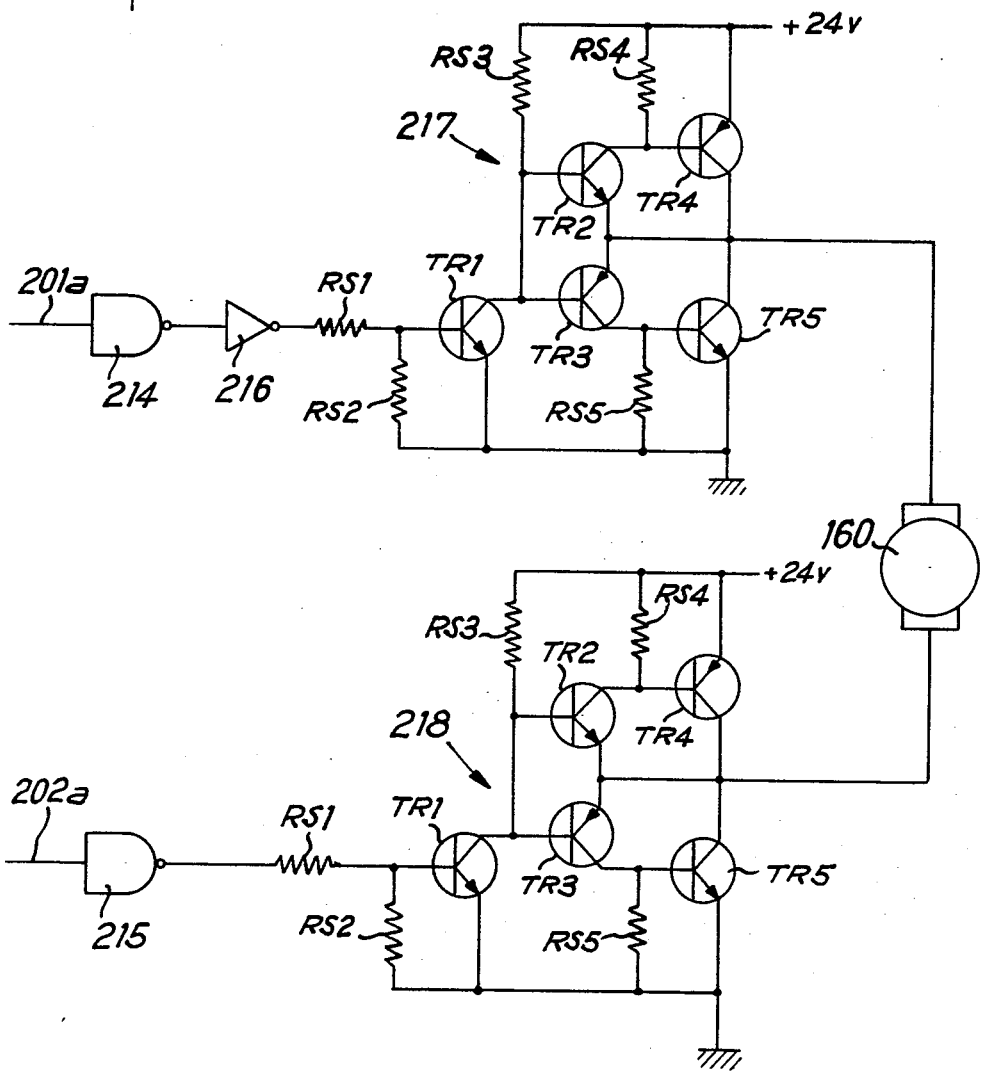

FIG. 29 shows an embodiment of the control circuit of the auxiliary motor 160.

The outputs 201a and 202a of the emitting and receiving units 201 and 202 are each connected to the input of a Schmitt trigger 214, 215. The output of the Schmitt trigger 214 is connected to the input of an amplifier 217 via an inverter 216 and a resistor RS1, while the Schmitt trigger 215 is connected to the input of an amplifier 218 via a resistor RS2. The outputs of amplifiers 217 and 218 control the starting up of auxiliary motor 160.

Amplifiers 217 and 218 are identical and have an input transistor TR1, whose base is connected to earth by a resistor RS3, whose emitter is earthed and whose collector is connected on the one hand to the bases of the two transistors of opposite polarity TR2 and TR3 and on the other hand to the voltage source +V. The collectors of transistors TR2 and TR3 are respectively connected to the bases of transistors TR4 and TR5 of opposite polarity, the emitter-collector circuits of which are connected in series between the source +V and earth. The emitters of transistors TR2 and TR3 and the collectors of transistors TR4 and TR5 are connected together to provide the amplifier output. Resistors RS4 and RS5 connect the bases of transistors TR4 and TR5 respectively to source +V and to earth. Transistors TR2 to TR5 in fact constitute a per se known electronic relay.

When unit 201 transmits no signal at its output 201a, inverter 216 applies a signal to the input of amplifier 217, whose output therefore passes to potential +V. When unit 201 transmits a signal, inverter 216 blocks transistor TR1 of amplifier 217, whose output passes to earth potential.

As there is no inverter at the input of amplifier 218, the latter has its output at potential +V when unit 202 transmits a signal in its output 202a and at earth potential when unit 202 transmits no signal.

According to the amplitude and the direction of the potential difference applied to the auxiliary motor 160, the latter is stopped, in forward gear or in reverse gear, depending on whether a single unit 201, 202 transmits a signal, the two units transmit a signal or each of the two units transmits no signal.

The kinematic connection between the second input of the multidifferential device 151 and the main motor 162 on the one hand and the auxiliary motor 160 on the other need not be via a pair of reversing pinions 189, 191 and a simple differential 155 as shown in FIG. 22. Two other embodiments of this connection are shown in FIGS. 23 and 24.

In the embodiment shown in FIG. 23, for the reversal of the movement of main motor 162 and in place of the simple auxiliary differential 155, a multidifferential device is provided, mounted on the same common shaft 301 as the multidifferential device associated with the pressure and drive rollers 111 to 116 and described more particularly in conjunction with FIG. 3. Via the transmission system 156 and 157a, main motor 162 drives the dog 133 of the sewing machine 131. Moreover, via its shaft 165 at a pinion 191, it acts on a planetary gear member and differential holder 210 which idles in rotation on the common shaft 301, and is located in the vertical plane comprising needle 130 or reference point P and perpendicular to the common shaft 301, as well as to the shaft 120 of the pressure and drive rollers 111 to 116. The input member 210 is of identical design to that of members 11 to 20 of the multidifferential device shown in FIG. 3. In other words, the input member 210 has a planetary gear toothed rim on either side of its median plane perpendicular to the common shaft 301, as well as to epicyclic gears. The second input member is, in this case, constituted by two end members 221 keyed on the common shaft 310, at the ends of the latter. Two end members 221 which constitute the second input member, each comprise a toothed rim 24 or 27, like members 21 or 10 in FIG. 3. Each rim cooperates with an epicyclic gear wheel mounted on the adjacent members. The right-hand end member in FIG. 23 at the same time constitutes the output planetary gear 187 of the auxiliary differential, whose second planetary gear member 188 is designed identically to the intermediate members 11, 13, 15, 17, 19 of the multidifferential device of FIG. 3, except that it has no external connecting member 23. Between the two members 188 and 187 is located the differential holder 197, which idles on shaft 301 and carries on its periphery a toothed rim, which meshes with a toothed wheel 183 keyed on the output shaft of auxiliary motor 160. On the side turned towards member 188, member 186 has an inner toothed rim which cooperates with the epicyclic gears mounted on the adjacent member 188 and which, therefore, in the same way as member 186, acts both as a planetary gear and a differential holder. Between the first input member of the multidifferential device and the planetary gear input member 188 of the single auxiliary differential constituted by members 187, 186 and 188, there is mounted on shaft 301, so as to rotate relative to the latter, a device of the planetary gear and differential holder type 290 which is designed in identical manner to the members 12, 14, 16, 18 or 20 of the multidifferential device according to FIG. 3. Such device is permanently blocked, along its periphery, by braking member 310, so that it remains immobile. As a result of this design, the device 290 imparts to member 188 a rotational movement in the direction opposite to that of the input member 210 which also cooperates with the reversing device 290. Thus, at the output of the single auxiliary differential 188, 186, 187, i.e. with reference to the planetary gear member 187, a rotation speed is obtained which corresponds to the sum of the rotation speed of the main motor 162 and double the rotation speed of the auxiliary motor. As the member 187 is keyed, like the lefthand end member 221 on the common shaft 301, the second input member 221 (to the left in FIG. 23) of the multidifferential device is driven at the same speed as the output member 187 of the auxiliary differential. Obviously, for reasons of simplicity, all the epicyclic gears and all the planetary gear rims have not been shown on certain of the members 11 to 20.

In the embodiment shown in FIG. 23, the first input member 210 of the multidifferential device is arranged in the vertical plane passing through the reference point P or the needle 130. Such member idles in rotation on shaft 301, being subject to the action of main motor 162 and acting on the reversing device 290 which is adjacent thereto.

According to the embodiment shown in FIG. 24, the first input member of the multidifferential device cooperates with the pressure and drive rollers 111 to 116 and 211, and comprises two planetary gear wheels 210a and 210b, each keyed to one of the ends of the common shaft 301. Planetary gear wheel 210a is located in the vertical plane passing through the needle 130 of the sewing machine 131 and is driven by main motor 162 by means of pinion 156 at a circumferential speed corresponding to the drive speed of dog 133, i.e. at the displacement speed of the textile article relative to needle 130 and in the vertical plane passing through the said needle and perpendicular to shaft 301. The planetary gear wheel of member 210a acts analogously to member 10 of FIG. 3 on the adjacent member 11 of the multidifferential device. At the other end of shaft 301 is fixed input member 210b which also forms part of the first input member of the multidifferential device, said first member comprising members 210a and 210b. The planetary gear member 210b is located in the vicinity of a reversing device 290 which idles in rotation on shaft 301 and which has a differential holder cooperating with member 210b and as a planetary gear cooperates with one (288) of the input members 288, 286 of the auxiliary differential 186, 187 and 288. All the members of 186, 187 and 288 of the auxiliary differential comprise members which idle in rotation about the common shaft 301, each being designed both as differential holders and planetary gears. The second input member 186 of the auxiliary differential receives its rotational movement via a toothed wheel 183 from the auxiliary motor 160. The output member 187 of this auxiliary differential at the same time serves as the second input member 221 for the multidifferential device cooperating with the pressure drive rollers 111 to 116 and 221. The difference between these two embodiments shown in FIGS. 23 and 24 is mainly that in the first case, the first input member 210 of the multidifferential device idles in rotation on common shaft 301 and cooperates on one side with the intermediate members of the multidifferential device and on the other with the reversing device 290, while the second input member of the said multidifferential device is constituted by two planetary gear wheels 221, each arranged at one of the ends of the common shaft, one coinciding with the output planetary gear of the auxiliary differential 186, 187 and 288 and the other constituting the end member of the multidifferential device. In the second embodiment, it is the first input member of the multidifferential device which is constituted by two planetary gear wheels 210a and 210b, each keyed to one of the ends of common shaft 301, while the second input member 221 of the multidifferential device idles in rotation on the said shaft 301 and at the same time constitutes the output member 187 of the auxiliary differential 186, 187 and 288.

It is obvious that the various embodiments described hereinbefore can undergo a certain number of modifications without passing beyond the scope of the present invention. Thus, the drive member constituted, for example, by the dog can also impart to the article an average speed which varies relative to time, without the operating procedure for the installation varying significantly from that described hereinbefore. Thus, the breadth of the invention is intended to be limited only as defined in the following claims.

What is claimed is:

1. A multidifferential device of the type comprising a plurality of differentials, whereby each comprises a differential holder with at least two epicyclic gears and two planetary gears and in which the imaginary rotation axis of all the differential holders and planetary gears is the same, whereby the differential holders and planetary gears are designed as rotary members whereof two serve as input members and one serves as the output member and which comprise two end members and, between them, a plurality of intermediate members in which an end input or output member is constituted as a planetary gear, whereby the epicyclic gears of every other intermediate differential holder member is located at the same radial level relative to said rotation axis, in which a plurality of intermediate differential holder members each comprises an external or internal planetary gear path on both of its faces and at least one inner or outer epicyclic gear and in which each end member comprises a planetary gear, wherein it comprises at least two output members, wherein each of the members can be an input member or an output member, wherein all the members idle in rotation but are immobile in axial displacement of the same common support axis wherein each intermediate member constitutes at the same time a differential holder and a planetary gear, wherein each member comprises in its peripheral area a connecting member able to cooperate with a driving or driven member, wherein each input or output member comprises a circular disc and wherein each disc of an input or output member comprises, facing the adjacent member a toothed rim as well as at least one epicyclic gear wheel on the one hand mounted on said disc between the toothed rim and either the periphery of said disc or the common shaft and on the other able to cooperate with the toothed rim of the adjacent member.

2. A multidifferential device according to claim 1, wherein the epicyclic gears comprise rollers mounted on the input or output members so as to be able to rotate freely about a radial axis perpendicular to the common shaft and so as to be in frictional contact with both of their adjacent members.

3. A multidifferential device according to claim 1, wherein the epicyclic gears are partly located in the housing openings made in each intermediate member.

4. A multidifferential device according to claim 2, wherein the input or output members comprise, facing said rollers, an annular roller path preferably made from a slightly compressible material.

5. A multidifferential device according to claim 1, wherein the epicyclic gears comprise spur-geared wheels and are mounted on either side of the lateral faces of each intermediate input or output member.

6. A multidifferential device according to claim 5, wherein the epicyclic spur-geared wheels of one and the same intermediate member are each mounted on a rotation shaft, interconnected in rotation by a toothed reversing wheel which is also mounted on said member, and cooperating with a toothed rim of one of the adjacent members, said rim having straight external toothing.

7. A multidifferential device according to claim 5, wherein the epicyclic spur-geared wheels are mounted in pairs on the same shaft on either side of the input or output member and cooperate in one case with a toothed rim with a straight inner toothing mounted on one of the adjacent input or output members and in the other case with a toothed rim with straight outer toothing mounted on the other adjacent member.

8. An automatic guidance installation for placing an article in front of a work point associated with the implacement of a tool, following a random but predetermined path, said installation constituting the application of the multidifferential device according to claim 1 and being more particularly intended for the guidance of textile articles to be assembled by sewing and associated with a sewing machine equipped with a work table, said machine being of the type comprising, in addition to a work area, a rectilinear member able to impart to that portion of the article located adjacent the work point a translational movement in accordance with a predetermined direction; a detecting means provided upstream of the work point for determining the position of a portion of the edge of the article relative to the work point; a drive mechanism which is able to come into contact with the article at a plurality of points located on a straight line passing through said work point and perpendicular to the drive direction of the rectilinear drive member, and being operable to impart to the said article in the area of the contact points a pivotal movement about a point located on said straight line and constituting a momentary center of curvature of a portion of a curve passing at the considered moment through the work point and associated with said article; the drive mechanism further comprising a plurality of drive rollers, a main drive motor, a reversible auxiliary motor controlled by the detecting means and a differential, one input of which is mechanically connected to the main drive motor and the other input of which is mechanically connected to the auxiliary motor; the output of said differential controlling one of the drive rollers; the guidance installation further comprising, in the drive mechanism, a plurality of equal diameter pressure and drive rollers arranged above the work table, mounted so as to idle in rotation and at equal distance from one another on a common shaft whose vertical projection coincides with a straight line which is perpendicular to the direction of the translational movement imparted on the article by the rectilinear drive member and which passes through the work point; a multidifferential device equipped with a plurality of output members each connected kinematically to one of said rollers and two input members; a reversing device placed between the main motor and the second input member of the multidifferential device; a single auxiliary differential having one planetary gear input thereof cooperating with the output of the reversing device and the planetary gear output cooperating with the second input member of the multidifferential device; the differential holder input thereof cooperating with the output of the reversible auxiliary motor; and the input member which is connected to the main drive motor being located at least approximately in the same vertical plane as the said rectilinear drive member.

9. A guidance installation according to claim 8, wherein the input member which is connected to the auxiliary motor is the terminal member of the differential device.

10. A guidance installation according to claim 8, wherein the main drive motor is a constant speed motor.

11. A guidance installation according to claim 8, wherein the pressure and drive rollers are equipped with a lifting device able to pivot about the axis of the multidifferential device.

12. A guidance installation according to claim 8, wherein each pressure and drive roller has a peripheral groove and is connected to the multidifferential device by means of a connecting belt partly located in the said groove.

13. A guidance installation according to claim 8, wherein the distance between the work point and the first pressure and drive roller adjacent to the said point is slightly less than the distance between two adjacent pressure and drive rollers.

14. A guidance installation according to claim 8, wherein at least one of the input members of the multidifferential device idles in rotation, in the same way as all the output members, on a common shaft parallel to the common shaft of the pressure and drive rollers, wherein the input members are provided at the ends of the multidifferential device and have at least on the side facing the adjacent output member, a planetary gear rim cooperating with the epicyclic gears of the adjacent output member, and each output member serving both as a differential holder and a planetary gear having on each side a planetary gear rim of the same diameter and alternating from one member to the next on the inside or outside of the epicyclic gears cooperating with the corresponding planetary gear rim of the adjacent member.

15. A guidance installation according to claim 8, wherein the reversing device comprises two reversing pinions, one of said pinions being integral with one of the planetary gears of the auxiliary differential and cooperating with the other reversing pinion keyed on the shaft of the main motor.

16. A guidance installation according to claim 8, wherein the multidifferential device, the reversing device and the single auxiliary differential are mounted on the same common shaft.

17. A guidance installation according to claim 16, wherein the two input members of the auxiliary differential, as well as the reversing device, each serve both as differential holders and planetary gears, the reversing device being mounted so as to rotate on the common shaft of the multidifferential device and the single differential and being immobilized in rotation about said shaft, one of the two output members of the multidifferential device being keyed on the common shaft and comprising two planetary gear members integral with the common shaft, each of said planetary gear members being arranged at one of the ends of said shaft and on either side of the system constituted by the multidifferential device, the auxiliary differential and the reversing device.

18. A guidance installation according to claim 8, wherein the auxiliary motor is a motor which rotates intermittently and at constant speed in one direction or the other.

19. A guidance installation according to claim 8, wherein the detector device comprises two emitting and receiving units for light rays, and a reflecting mirror incorporated in the work table slightly upstream of the work point and below the said units.

20. A guidance installation according to claim 19, wherein the output of each of the two emitting and receiving units is connected to one of the inputs of an AND gate and of a NOR gate, the outputs of which control the forward gear energizing circuit and the reverse gear energizing circuit of the auxiliary motor.

21. A guidance installation according to claim 19, wherein one of the emitting and receiving units is connected to a first amplifier forming an electronic relay via an inverter, and the other unit is connected to a second amplifier forming an electronic relay, each of said electronic relays being connected at its output to the auxiliary motor; the output of each said relay being a first or a second potential the selection of which is a function of the output signal of the corresponding emitting and receiving unit, whereby the forward and reverse running of the auxiliary motor and its maintaining of a stopped status are functions of the signals transmitted by the emitting and receiving units.

* * * * *

UNITED STATES PATENT AND TRADEMARK OFFICE
CERTIFICATE OF CORRECTION

PATENT NO. : 4,109,595
DATED : August 29, 1978
INVENTOR(S) : Jean-Paul Ducol et al It is certified that error appears in the above-identified patent and that said Letters Patent are hereby corrected as shown below:

Column 11, line 30, "$V_1 V$" should read --$V_1 = V$--

Signed and Sealed this

Seventeenth Day of July 1979

[SEAL]

Attest:

Attesting Officer

LUTRELLE F. PARKER
Acting Commissioner of Patents and Trademarks